United States Patent
Jeon et al.

(10) Patent No.: US 10,025,345 B2
(45) Date of Patent: Jul. 17, 2018

(54) SYSTEM ON CHIP AND INTEGRATED CIRCUIT FOR PERFORMING SKEW CALIBRATION USING DUAL EDGE AND MOBILE DEVICE INCLUDING THE SAME

(71) Applicant: SAMSUNG ELECTRONICS CO., LTD., Suwon-si (KR)

(72) Inventors: Phil Jae Jeon, Hwaseong-si (KR); Gyeong Han Cha, Geoje-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 121 days.

(21) Appl. No.: 15/285,633

(22) Filed: Oct. 5, 2016

(65) Prior Publication Data

US 2017/0097655 A1    Apr. 6, 2017

(30) Foreign Application Priority Data

Oct. 5, 2015 (KR) .................. 10-2015-0139901
Apr. 29, 2016 (KR) .................. 10-2016-0052831

(51) Int. Cl.
G06F 9/00 (2006.01)
G06F 1/12 (2006.01)
G06F 1/10 (2006.01)
H04L 7/00 (2006.01)

(52) U.S. Cl.
CPC .................. *G06F 1/12* (2013.01); *G06F 1/10* (2013.01); *H04L 7/0041* (2013.01)

(58) Field of Classification Search
CPC ............. G06F 1/12; G06F 1/10; H04L 7/0041
USPC .......... 713/503, 501, 401; 716/108; 714/748
See application file for complete search history.

(56) References Cited

U.S. PATENT DOCUMENTS

| | | | |
|---|---|---|---|
| 6,233,205 B1 | 5/2001 | Wells et al. | |
| 6,239,611 B1 | 5/2001 | Matera | |
| 6,564,360 B2 | 5/2003 | Chiu | |
| 6,650,575 B1 | 11/2003 | Khanna | |
| 7,031,420 B1 | 4/2006 | Jenkins et al. | |
| 7,138,829 B1 | 11/2006 | Dalvi | |
| 7,301,996 B1 | 11/2007 | Chi et al. | |
| 7,353,419 B1* | 4/2008 | Liu ......................... | G06F 1/10 713/503 |
| 7,822,143 B2 | 10/2010 | Kikuchi | |
| 8,191,029 B2* | 5/2012 | Tetelbaum .......... | G06F 17/5031 716/108 |
| 8,837,657 B1* | 9/2014 | Amourah ............... | H04L 7/033 375/340 |
| 2003/0005345 A1* | 1/2003 | Fletcher .................. | G06F 1/06 713/401 |
| 2004/0178836 A1* | 9/2004 | Kim ...................... | H03K 5/135 327/161 |

(Continued)

*Primary Examiner* — Aurel Prifti
(74) *Attorney, Agent, or Firm* — Sughrue Mion, PLLC

(57) ABSTRACT

A system on chip is provided. The system on chip includes a delay control circuit configured to generate delayed clock signals having different delays, based on each of a first rising edge and a first falling edge of an input clock signal, and generate delayed data signals having different delays, based on each of a second rising edge and a second falling edge of an input data signal. The system on chip further includes a de-skew control circuit configured to control the delay control circuit to adjust a delay of each of the first rising edge, the first falling edge, the second rising edge, and the second falling edge.

20 Claims, 15 Drawing Sheets

(56) References Cited

U.S. PATENT DOCUMENTS

| | | | | |
|---|---|---|---|---|
| 2010/0253405 A1* | 10/2010 | Quan | ............ | H03K 5/1515 327/158 |
| 2015/0033061 A1* | 1/2015 | Yu | ............ | G06F 21/50 713/501 |
| 2015/0067432 A1* | 3/2015 | Shim | ............ | G06F 11/1412 714/748 |
| 2015/0192949 A1 | 7/2015 | Wu et al. | | |

* cited by examiner

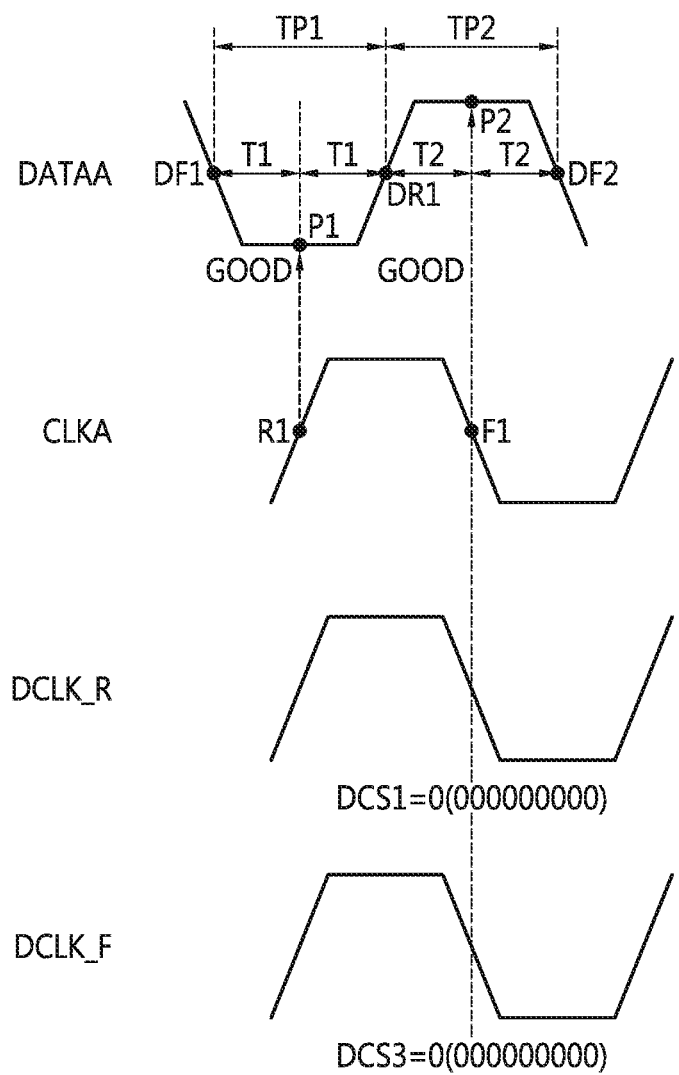

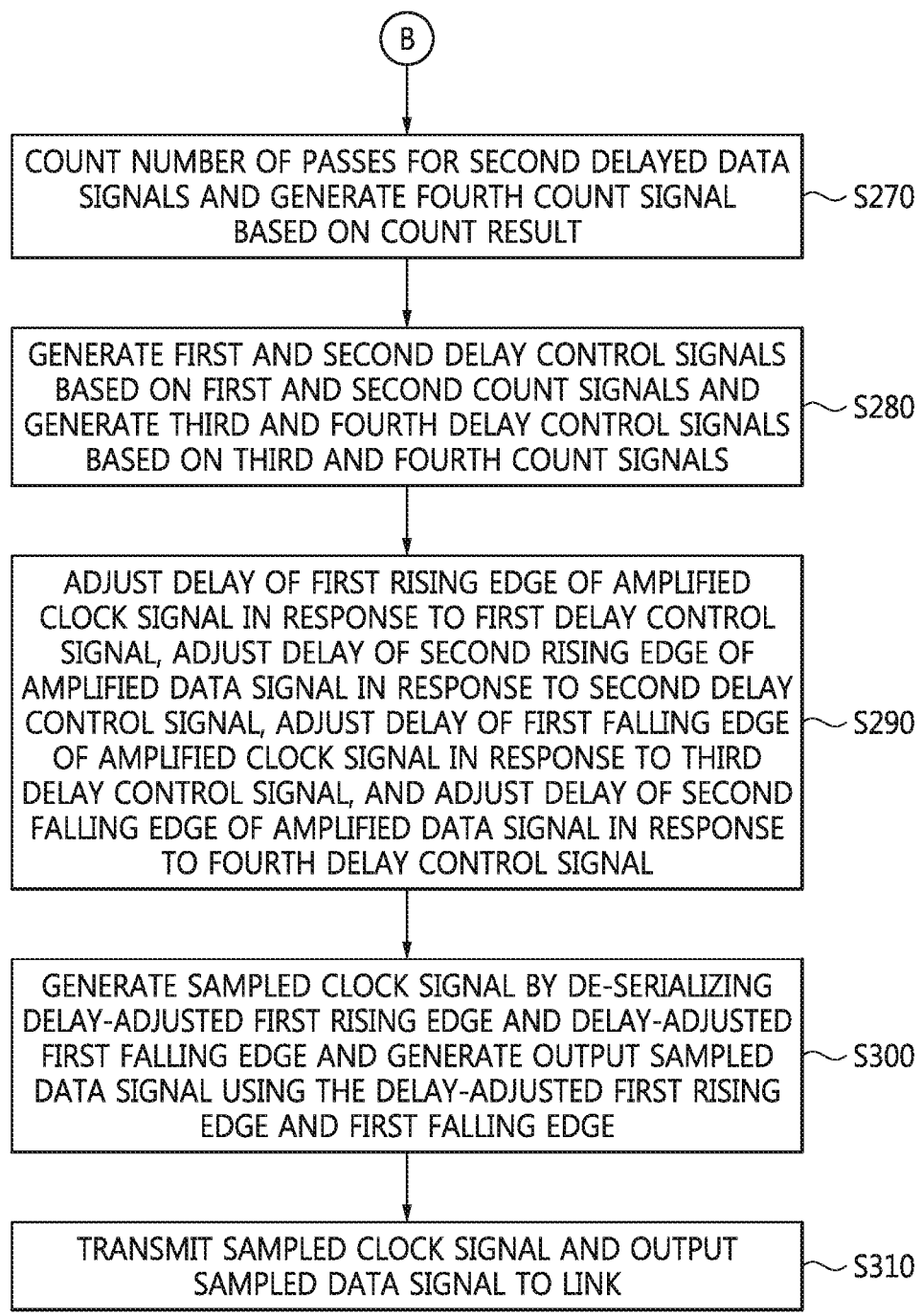

SYSTEM ON CHIP AND INTEGRATED CIRCUIT FOR PERFORMING SKEW CALIBRATION USING DUAL EDGE AND MOBILE DEVICE INCLUDING THE SAME

CROSS-REFERENCE TO RELATED APPLICATIONS

This application claims priority from Korean Patent Application No. 10-2015-0139901, filed on Oct. 5, 2015, and Korean Patent Application No. 10-2016-0052831, filed on Apr. 29, 2016, the disclosures of which are incorporated herein by reference in their entireties.

BACKGROUND

1. Field

Apparatuses consistent with example embodiments relate to a system on chip (SOC), and more particularly, to a SOC for performing skew calibration using both a rising edge and a falling edge of each of a clock signal and data.

2. Description of Related Art

Mobile phones, digital cameras, memory devices and so on transmitting a clock signal and data together using a serial interface may be implemented, and their sizes or power can be minimized compared to using a clock embedded serial interface. However, there is a limit to increasing a transmission speed due to skew between the clock signal and the data that is caused by an error occurring during the transmission. Recently, a transmission speed of at least 4 Gbps has been realized due to the development of skew calibration technology. However, as the transmission speed increases, duty distortion and signal distortion in the clock signal and the data are more influenced by a channel or chip processes.

SUMMARY

According to example embodiments, a system on chip includes a clock input pin configured to receive an input clock signal, a data input pin configured to receive an input data signal, and a delay control circuit configured to generate first delayed clock signals having different delays, based on a first rising edge of the input clock signal, generate second delayed clock signals having different delays, based on a first falling edge of the input clock signal, generate first delayed data signals having different delays, based on a second rising edge of the input data signal; and generate second delayed data signals having different delays, based on a second falling edge of the input data signal. The system on chip further includes a sampling circuit configured to perform first sampling on the input data signal, based on the first delayed clock signals, to generate first sampled data signals, perform second sampling on the first delayed data signals, based on the input clock signal, to generate second sampled data signals, perform third sampling on the input data signal, based on the second delayed clock signals, to generate third sampled data signals, and perform fourth sampling on the second delayed data signals, based on the input clock signal, to generate fourth sampled data signals. The system on chip further includes a de-skew control circuit configured to compare the first sampled data signals with a first reference signal, and decide a pass or a fail of each of the first sampled data signals, based on the comparison of the first sampled data signals with the first reference signal, compare the second sampled data signals with a second reference signal, and decide a pass or a fail of each of the second sampled data signals, based on the comparison of the second sampled data signals with the second reference signal, compare the third sampled data signals with a third reference signal, and decide a pass or a fail of each of the third sampled data signals, based on the comparison of the third sampled data signals with the third reference signal, and compare the fourth sampled data signals with a fourth reference signal, and decide a pass or a fail of each of the fourth sampled data signals, based on the comparison of the fourth sampled data signals with the fourth reference signal.

According to example embodiments, a mobile system includes a system on chip, and a data transmitter configured to transmit, to the system on chip, an input data signal and an input clock signal. The system on chip includes a clock input pin configured to receive the input clock signal, a data input pin configured to receive the input data signal, and a delay control circuit configured to generate first delayed clock signals having different delays, based on a first rising edge of the input clock signal, generate second delayed clock signals having different delays, based on a first falling edge of the input clock signal, generate first delayed data signals having different delays, based on a second rising edge of the input data signal, and generate second delayed data signals having different delays, based on a second falling edge of the input data signal. The system on chip further includes a sampling circuit configured to perform first sampling on the input data signal, based on the first delayed clock signals, to generate first sampled data signals, perform second sampling on the first delayed data signals, based on the input clock signal, to generate second sampled data signals, perform third sampling on the input data signal, based on the second delayed clock signals, to generate third sampled data signals; and perform fourth sampling on the second delayed data signals, based on the input clock signal, to generate fourth sampled data signals. The system on chip further includes a de-skew control circuit configured to compare the first sampled data signals with a first reference signal, and decide a pass or a fail of each of the first sampled data signals, based on the comparison of the first sampled data signals with the first reference signal, compare the second sampled data signals with a second reference signal, and decide a pass or a fail of each of the second sampled data signals, based on the comparison of the second sampled data signals with the second reference signal, compare the third sampled data signals with a third reference signal, and decide a pass or a fail of each of the third sampled data signals, based on the comparison of the third sampled data signals with the third reference signal, and compare the fourth sampled data signals with a fourth reference signal, and decide a pass or a fail of each of the fourth sampled data signals, based on the comparison of the fourth sampled data signals with the fourth reference signal.

According to example embodiments, an integrated circuit includes a clock input pin configured to receive an input clock signal, a data input pin configured to receive an input data signal, and a delay control circuit configured to generate first delayed clock signals having different delays, based on a first rising edge of the input clock signal, generate second delayed clock signals having different delays, based on a first falling edge of the input clock signal, generate first delayed data signals having different delays, based on a second rising edge of the input data signal, and generate second delayed data signals having different delays, based on a second falling edge of the input data signal. The integrated circuit further includes a sampling circuit configured to perform first sampling on the input data signal, based on the first delayed clock signals, to generate first sampled data signals, perform second sampling on the first delayed data signals, based on the input clock signal, to generate second sampled data signals, perform third sampling on the input data signal, based on the second delayed clock signals, to generate third sampled data signals, and perform fourth sampling on the second delayed data signals, based on the input clock signal, to generate fourth sampled data signals. The integrated circuit further includes a de-skew control circuit configured to compare the first sampled data signals with a first reference signal, and decide a pass or a fail of each of the first sampled data signals, based on the comparison of the first sampled data signals with the first reference signal, compare the second sampled data signals with a second reference signal, and decide a pass or a fail of each of the second sampled data signals, based on the comparison of the second sampled data signals with the second reference signal, compare the third sampled data signals with a third reference signal, and decide a pass or a fail of each of the third sampled data signals, based on the comparison of the third sampled data signals with the third reference signal, compare the fourth sampled data signals with a fourth reference signal, and decide a pass or a fail of each of the fourth sampled data signals, based on the comparison of the fourth sampled data signals with the fourth reference signal, generate a first count signal, based on a number of passes decided for the first sampled data signals, generate a second count signal, based on a number of passes decided for the second sampled data signals, generate a third count signal, based on a number of passes decided for the third sampled data signals, generate a fourth count signal, based on a number of passes decided for the fourth sampled data signals, transmit, to the delay control circuit, a first delay control signal for controlling a delay of the first rising edge, and transmit, to the delay control circuit, a second delay control signal for controlling a delay of the second rising edge, based on the first count signal and the second count signal, and transmit, to the delay control circuit, a third delay control signal for controlling a delay of the first falling edge, and transmit, to the delay control circuit, a fourth delay control signal for controlling a delay of the second falling edge, based on the third count signal and the fourth count signal.

According to example embodiments, a system on chip includes a delay control circuit configured to generate first delayed clock signals having different delays, based on a first rising edge of an input clock signal and on a first delay control signal, generate second delayed clock signals having different delays, based on a first falling edge of the input clock signal and on a third delay control signal, generate first delayed data signals having different delays, based on a second rising edge of an input data signal and on a second delay control signal, and generate second delayed data signals having different delays, based on a second falling edge of the input data signal and on a fourth delay control signal. The system on chip further includes a sampling circuit configured to perform first sampling on the input data signal, based on the first delayed clock signals, to generate first sampled data signals, perform second sampling on the first delayed data signals, based on the input clock signal, to generate second sampled data signals, perform third sampling on the input data signal, based on the second delayed clock signals, to generate third sampled data signals, and perform fourth sampling on the second delayed data signals, based on the input clock signal, to generate fourth sampled data signals. The system on chip further includes a de-skew control circuit configured to control the delay control circuit to adjust the delay of the first rising edge of the input clock signal, based on the first sampled data signals, adjust the delay of the second rising edge of the input data signal, based on the second sampled data signals, adjust the delay of the first falling edge of the input clock signal, based on the third sampled data signals, and adjust the delay of the second falling edge of the input data signal, based on the fourth sampled data signals.

BRIEF DESCRIPTION OF THE DRAWINGS

FIG. 10A is a diagram illustrating an example in which skew calibration is performed on the amplified data signal having a duty ratio of 5:5 and the amplified clock signal, according to example embodiments.

FIGS. 11, 12, and 13 are flowcharts of a procedure in which an SOC performs skew calibration, according to example embodiments.

DETAILED DESCRIPTION OF THE EXAMPLE EMBODIMENTS

In the specification, the term "pass" may mean a case in which the state of a data signal sampled at a rising edge of a clock signal is low or "0" or a case in which the state of a data signal sampled at a falling edge of the clock signal is high or "1". Contrarily, the term "fail" means a state that is not a pass, i.e., a case in which the state of a data signal sampled at a rising edge of a clock signal is high or "1" or a case in which the state of a data signal sampled at a falling edge of the clock signal is low or "0".

The term "duty" or "duty ratio" may be the ratio between the time a data signal or a clock signal is "1" or high and the time the data signal or the clock signal is "0" or low. Accordingly, when the time the data signal or the clock signal is "1" or high is the same as the time the data signal or the clock signal is "0" or low, the duty ratio is 5:5; and when the ratio between the data signal or the clock signal is "1" or high and the time the data signal or the clock signal is "0" or low is 4:6, the duty ratio is 4:6.

The term "tap" may be a unit of the phase or time of a delay of an amplified clock signal and/or an amplified data signal that occurs when delay cells are turned on. For instance, when only a first delay cell is turned on, the amplified clock signal and/or the amplified data signal may be delayed by one tap; when first and second delay cells are turned on, the amplified clock signal and/or the amplified data signal may be delayed by two taps; and when sequentially-connected N delay cells (where N is a natural number of at least 3) are turned on, the amplified clock signal and/or the amplified data signal may be delayed by N taps.

Figure 1:
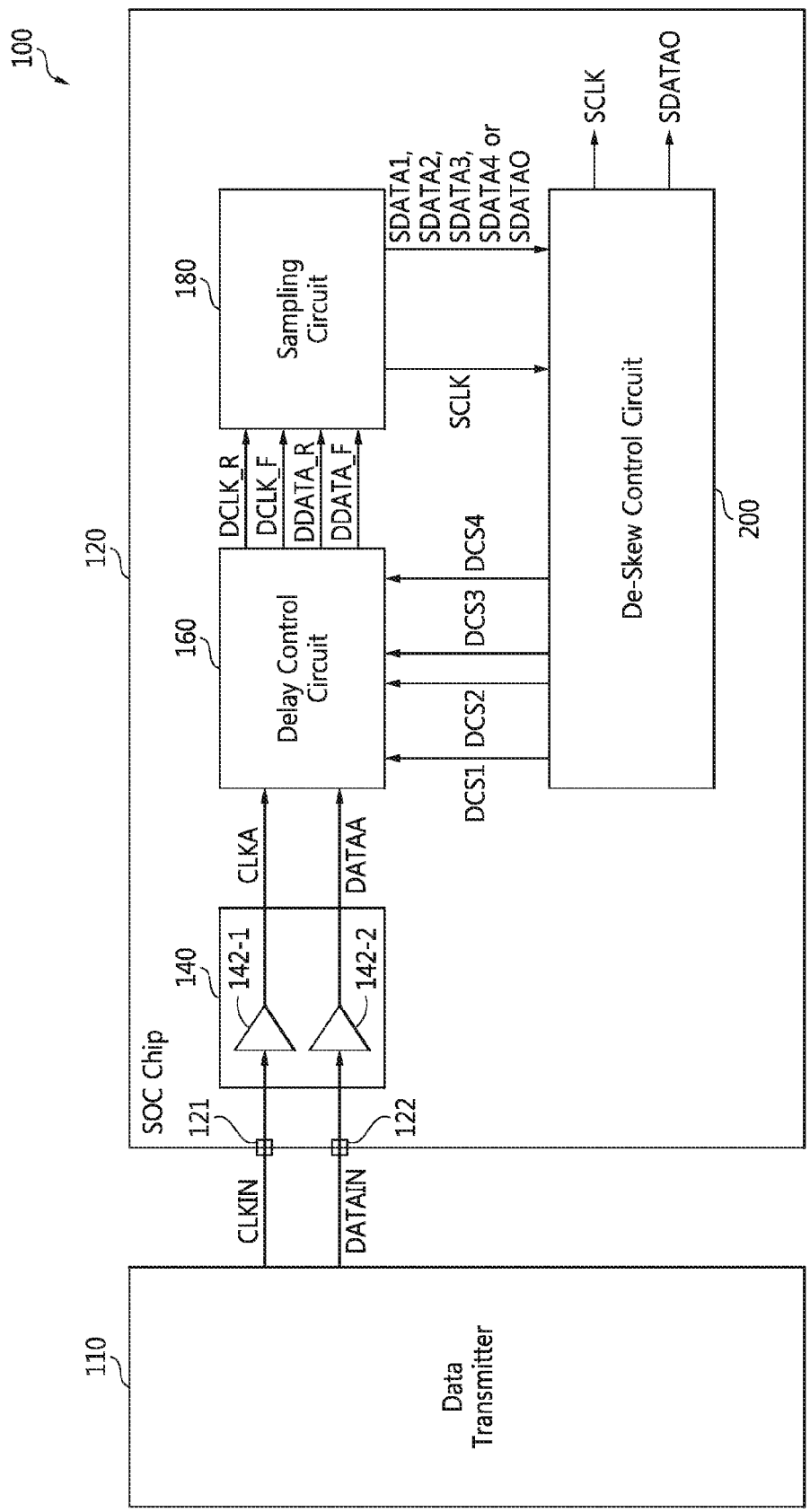
FIG. 1 is a block diagram of a mobile system according to example embodiments.

FIG. 1 is a block diagram of a mobile system 100 according to example embodiments. The mobile system 100 includes a data transmitter 110 and a system on chip (SOC) 120. The data transmitter 110 transmits a clock signal CLKIN and data DATAIN to the SOC 120 through different paths. The SOC 120 includes a clock input pad 121, a data input pad 122, a receiver 140, a delay control circuit 160, a sampling circuit 180, and a de-skew control circuit 200.

The SOC 120 receives the input clock signal CLKIN from the data transmitter 110 through the clock input pad 121 and receives the input data signal DATAIN from the data transmitter 110 through the data input pad 122.

The receiver 140 receives the input clock signal CLKIN through the clock input pad 121 and the input data signal DATAIN through the data input pad 122. The receiver 140 amplifies the input clock signal CLKIN using a first amplifier 142-1, generates an amplified clock signal CLKA as the amplification result, amplifies the input data signal DATAIN using a second amplifier 142-2, and generates an amplified data signal DATAA as the amplification result.

The delay control circuit 160 receives a plurality of delay control signals DCS1, DCS2, DCS3, and DCS4 from the de-skew control circuit 200, and adjusts the delay of each of the amplified clock signal CLKA and the amplified data signal DATAA, based on the delay control signals DCS1 through DCS4.

The delay control circuit 160 adjusts the delay of a first rising edge of the amplified clock signal CLKA, based on the first delay control signal DCS1, and outputs a group of first delayed clock signals DCLK_R having different delays to the sampling circuit 180. The delay control circuit 160 adjusts the delay of a second rising edge of the amplified data signal DATAA, based on the second delay control signal DCS2, and outputs a group of first delayed data signals DDATA_R having different delays to the sampling circuit 180.

The delay control circuit 160 adjusts the delay of a first falling edge of the amplified clock signal CLKA, based on the third delay control signal DCS3, and outputs a group of second delayed clock signals DCLK_F having different delays to the sampling circuit 180. The delay control circuit 160 adjusts the delay of a second falling edge of the amplified data signal DATAA based on the fourth delay control signal DCS2, and outputs a group of second delayed data signals DDATA_F having different delays to the sampling circuit 180.

The number of signals included in each of the groups of the signals DCLK_R, DDATA_R, DCLK_F, and DDATA_F may be changed according to the number of delays. For instance, when the delay control circuit 160 delays the amplified clock signal CLKA N times, the group of the first delayed clock signals DCLK_R may include N+1 clock signals having different delays from one another, and the group of the second delayed clock signals DCLK_F may include N+1 clock signals having different delays from one another. When the delay control circuit 160 delays the amplified data signal DATAA N times, the group of the first delayed data signals DDATA_R may include N+1 data signals having different delays from one another, and the group of the second delayed data signals DDATA_F may include N+1 data signals having different delays from one another.

The number of delays for each of the groups of the signals DCLK_R, DDATA_R, the DCLK_F, and DDATA_F may be changed. The same number of delays may be applied to the groups of the signals DCLK_R, DDATA_R, DCLK_F, and DDATA_F, but the inventive concept is not restricted to example embodiments.

When skew calibration of the amplified clock signal CLKA and the amplified data signal DATAA is not completed, the first delayed clock signals DCLK_R, the first delayed data signals DDATA_R, the second delayed clock signals DCLK_F, and the second delayed data signals DDATA_F may be output from the delay control circuit 160 at different timings. For instance, the delay control circuit 160 may sequentially output the first delayed clock signals DCLK_R having different delays from the first rising edge of the amplified clock signal CLKA, then sequentially output the first delayed data signals DDATA_R having different delays from the second rising edge of the amplified data signal DATAA, then sequentially output the second delayed clock signals DCLK_F having different delays from the first falling edge of the amplified clock signal CLKA, and lastly sequentially output the second delayed data signals DDATA_F having different delays from the second falling edge of the amplified data signal DATAA.

When skew calibration of the amplified clock signal CLKA and the amplified data signal DATAA is not completed, the order in which the first delayed clock signals DCLK_R, the first delayed data signals DDATA_R, the second delayed clock signals DCLK_F, and the second delayed data signals DDATA_F are output from the delay control circuit 160 may be changed. However, when skew calibration of the amplified clock signal CLKA and the amplified data signal DATAA is completed, the delay control circuit 160 may output the first delayed clock signals DCLK_R, the first delayed data signals DDATA_R, the second delayed clock signals DCLK_F, and the second delayed data signals DDATA_F, for which delays have been adjusted according to the delay control signals DCS1 through DCS4, to the sampling circuit 180 at the same time. The sampling circuit 180 receives the first delayed clock signals DCLK_R, the first delayed data signals DDATA_R, the second delayed clock signals DCLK_F, and the second delayed data signals DDATA_F, from the delay control circuit 160.

When skew calibration of the amplified clock signal CLKA and the amplified data signal DATAA is not completed, the sampling circuit 180 may receive the first delayed clock signals DCLK_R, the first delayed data signals DDATA_R, the second delayed clock signals DCLK_F, and the second delayed data signals DDATA_F sequentially. In other example embodiments, the order in which the sampling circuit 180 receives the first delayed clock signals DCLK_R, the first delayed data signals DDATA_R, the second delayed clock signals DCLK_F, and the second delayed data signals DDATA_F may be changed. However, when skew calibration of the amplified clock signal CLKA and the amplified data signal DATAA is completed, the sampling circuit 180 may receive the signals DCLK_R, DDATA_R, DCLK_F, and DDATA_F at the same time.

The sampling circuit 180 samples the first and second delayed data signals DDATA_R and DDATA_F based on the first and second delayed clock signals DCLK_R and DCLK_F, and outputs, as the sampling results, sampled data signals SDATA1, SDATA2, SDATA3, SDATA4, or SDATAO and a sampled clock signal SCLK to the de-skew control circuit 200.

When skew calibration of the amplified clock signal CLKA and the amplified data signal DATAA is not completed, the sampling circuit 180 may sequentially generate first sampled data signals SDATA1 based on the first delayed clock signals DCLK_R, second sampled data signals SDATA2 based on the first delayed data signals DDATA_R, third sampled data signals SDATA3 based on the second delayed clock signals DCLK_F, and fourth sampled data signals SDATA4 based on the second delayed data signals DDATA_F. The order in which the sampling circuit 180 generates the sampled data signals SDATA1 through SDATA4 may be determined depending on the order in which the delayed signals DCLK_R, DDATA_R, DCLK_F, and DDATA_F are received.

When skew calibration of the amplified clock signal CLKA and the amplified data signal DATAA is completed, the sampling circuit 180 may receive the first delayed clock signals DCLK_R, the first delayed data signals DDATA_R, the second delayed clock signals DCLK_F, and the second delayed data signals DDATA_F at the same time, and may sample the first delayed clock signals DCLK_R, the first delayed data signals DDATA_R, the second delayed clock signals DCLK_F, and the second delayed data signals DDATA_F to generate the output sampled data signal SDATAO and the sampled clock signal SCLK.

The de-skew control circuit 200 receives the sampled data signals SDATA1, SDATA2, SDATA3, SDATA4, or SDATAO and the sampled clock signal SCLK, and transmits the delay control signals DCS1 through DCS4 to the delay control circuit 160 to adjust the delays of the amplified clock signal CLKA and the amplified data signal DATAA.

When skew calibration of the amplified clock signal CLKA and the amplified data signal DATAA is not completed, the de-skew control circuit 200 may sequentially receive signals included in the sampled data signals SDATA1, SDATA2, SDATA3, or SDATA4, and may determine "pass" or "fail" with respect to each of the signals. For instance, when the de-skew control circuit 200 receives the first sampled data signals SDATA1, it may sequentially determine pass or fail with respect to each of the first sampled data signals SDATA1. When the de-skew control circuit 200 receives the second sampled data signals SDATA2, it may sequentially determine pass or fail with respect to each of the second sampled data signals SDATA2. When the de-skew control circuit 200 receives the third sampled data signals SDATA3, it may sequentially determine pass or fail with respect to each of the third sampled data signals SDATA3. When the de-skew control circuit 200 receives the fourth sampled data signals SDATA4, it may sequentially determine pass or fail with respect to each of the fourth sampled data signals SDATA4.

When skew calibration of the amplified clock signal CLKA and the amplified data signal DATAA is completed, the de-skew control circuit 200 outputs the output sampled data signal SDATAO and the sampled clock signal SCLK, which have been received from the sampling circuit 180, to a link.

Figure 2:
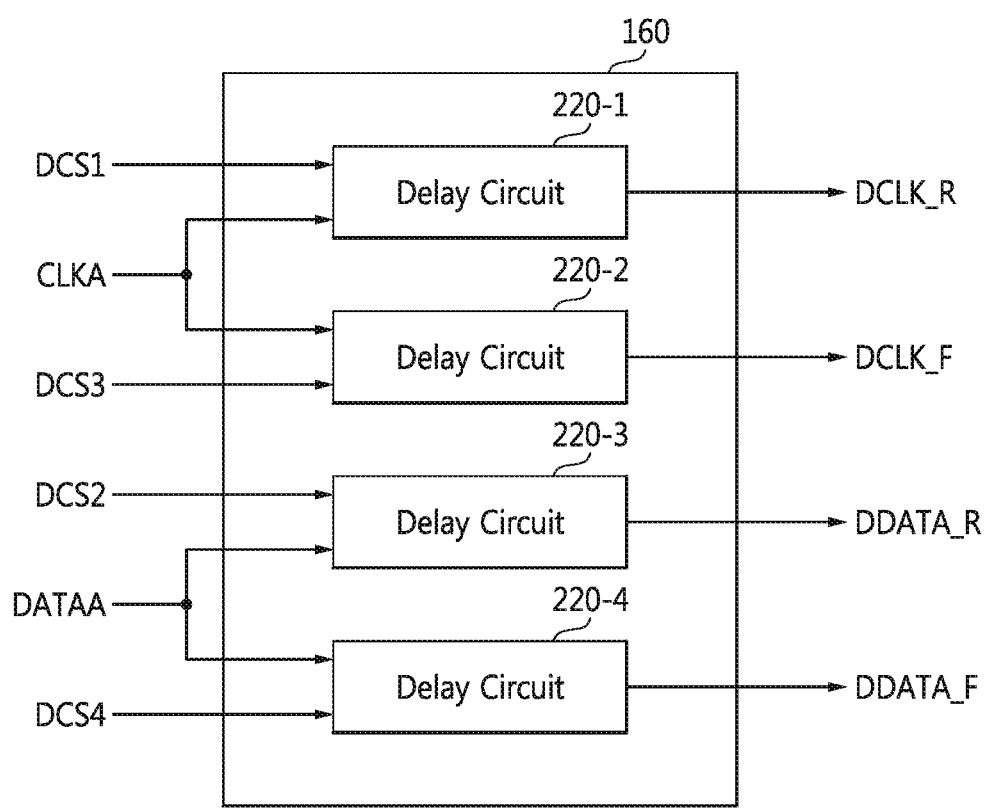
FIG. 2 is a detailed block diagram of a delay control circuit included in a system on chip (SOC) illustrated in FIG. 1.

FIG. 2 is a detailed block diagram of the delay control circuit 160 included in the SOC 120 illustrated in FIG. 1. Referring to FIGS. 1 and 2, the delay control circuit 160 includes a plurality of delay circuits 220-1, 220-2, 220-3, and 220-4. The first delay circuit 220-1 receives the amplified clock signal CLKA and the first delay control signal DCS1, adjusts the delay of the first rising edge of the amplified clock signal CLKA, based on the first delay control signal DCS1, and outputs the first delayed clock signals DCLK_R as the result of adjustment.

When skew calibration of the amplified clock signal CLKA and the amplified data signal DATAA is not completed, the first delay circuit 220-1 may sequentially output the first delayed clock signals DCLK_R having different delays from the first rising edge of the amplified clock signal CLKA. When skew calibration of the amplified clock signal CLKA and the amplified data signal DATAA is completed, the first delay circuit 220-1 may select one among the first delayed clock signals DCLK_R, based on the first delay control signal DCS1. In other words, the first delay circuit 220-1 may output one among the first delayed clock signals DCLK_R to the sampling circuit 180, based on the first delay control signal DCS1.

The second delay circuit 220-2 receives the amplified clock signal CLKA and the third delay control signal DCS3, adjusts the delay of the first falling edge of the amplified clock signal CLKA, based on the third delay control signal DCS3, and outputs the second delayed clock signals DCLK_F as the result of adjustment. When skew calibration of the amplified clock signal CLKA and the amplified data signal DATAA is not completed, the second delay circuit 220-2 may sequentially output the second delayed clock signals DCLK_F having different delays from the first falling edge of the amplified clock signal CLKA. When skew calibration of the amplified clock signal CLKA and the amplified data signal DATAA is completed, the second delay circuit 220-2 may select one among the second delayed clock signals DCLK_F, based on the third delay control signal DCS3. In other words, the second delay circuit 220-2 may output one among the second delayed clock signals DCLK_F to the sampling circuit 180, based on the third delay control signal DCS3.

The third delay circuit 220-3 receives the amplified data signal DATAA and the second delay control signal DCS2, adjusts the delay of the second rising edge of the amplified data signal DATAA, based on the second delay control signal DCS2, and outputs the first delayed data signals DDATA_R as the result of adjustment. When skew calibration of the amplified clock signal CLKA and the amplified data signal DATAA is not completed, the third delay circuit 220-3 may sequentially output the first delayed data signals DDATA_R having different delays from the second rising edge of the amplified data signal DATAA. When skew calibration of the amplified clock signal CLKA and the amplified data signal DATAA is completed, the third delay circuit 220-3 may select one among the first delayed data signals DDATA_R, based on the second delay control signal DCS2. In other words, the third delay circuit 220-3 may output one among the first delayed data signals DDATA_R to the sampling circuit 180, based on the second delay control signal DCS2.

The fourth delay circuit 220-4 receives the amplified data signal DATAA and the fourth delay control signal DCS4, adjusts the delay of the second falling edge of the amplified data signal DATAA, based on the fourth delay control signal DCS4, and outputs the second delayed data signals DDATA_F as the result of adjustment. When skew calibration of the amplified clock signal CLKA and the amplified data signal DATAA is not completed, the fourth delay circuit 220-4 may sequentially output the second delayed data signals DDATA_F having different delays from the second falling edge of the amplified data signal DATAA. When skew calibration of the amplified clock signal CLKA and the amplified data signal DATAA is completed, the fourth delay circuit 220-4 may select one among the second delayed data signals DDATA_F, based on the fourth delay control signal DCS4. In other words, the fourth delay circuit 220-4 may output one among the second delayed data signals DDATA_F to the sampling circuit 180, based on the fourth delay control signal DCS4.

Figure 3:
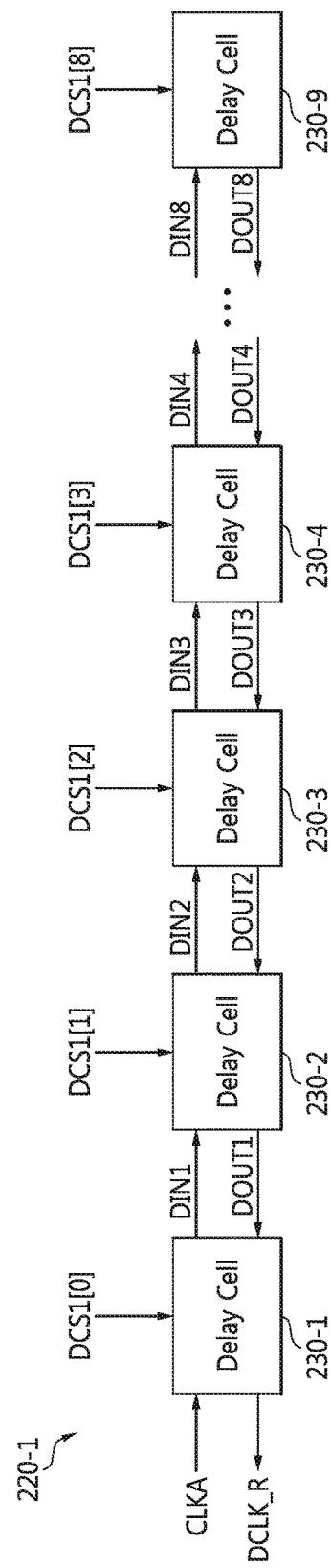
FIG. 3 is a detailed block diagram of a delay circuit illustrated in FIG. 2.

FIG. 3 is a detailed block diagram of the delay circuit 220-1 illustrated in FIG. 2. Referring to FIGS. 1 through 3, the first delay circuit 220-1 includes a plurality of delay cells 230-1 through 230-9. The delay circuits 220-1 through 220-4 may have the same functions and features as one another. Thus, only the first delay circuit 220-1 will be described. Although nine delay cells 230-1 through 230-9 are included in the first delay circuit 220-1 in the example embodiments illustrated in FIG. 3, the inventive concept is not restricted to the example embodiments. In other words, the number of delay cells included in each of the delay circuits 220-1 through 220-4 may be changed according to example embodiments.

The delay control signal DCS1 received by the first delay circuit 220-1 includes a plurality of bits. When the delay control signal DCS1 includes nine bits, a first bit DCS1[0] of the delay control signal DCS1 controls on/off of the first delay cell 230-1, a second bit DCS1[1] of the delay control signal DCS1 controls on/off of the second delay cell 230-2, a third bit DCS1[2] of the delay control signal DCS1 controls on/off of the third delay cell 230-3, a fourth bit DCS1[3] of the delay control signal DCS1 controls on/off of the fourth delay cell 230-4, and a ninth bit DCS1[8] of the delay control signal DCS1 controls on/off of the ninth delay cell 230-9.

When the first delay cell 230-1 is turned on, it outputs a first delayed input signal DIN1 that is obtained by delaying the amplified clock signal CLKA, to the second delay cell 230-2. Contrarily, when the first delay cell 230-1 is turned off, the amplified clock signal CLKA is not delayed, and the first delayed clock signal DCLK_R output from the first delay circuit 220-1 may be the same as the amplified clock signal CLKA.

When the first and second delay cells 230-1 and 230-2 are turned on, the second delay cell 230-2 outputs a second delayed input signal DIN2 that is obtained by delaying the first delayed input signal DIN1, to the third delay cell 230-3. Contrarily, when the first delay cell 230-1 is turned on but the second delay cell 230-2 is turned off, the first delayed input signal DIN1 is not delayed, and a first delayed output signal DOUT1 output from the second delay cell 230-2 may be the same as the first delayed input signal DIN1.

For instance, when the delay control signal DCS1 is "000000111", the first through third bits DCS1[0], DCS1[1], and DCS1[2] are "1" indicating "on", and the remaining bits DCS1[3] through DCS1[8] are "0" indicating "off". Accordingly, the first delayed clock signal DCLK_R output from the first delay circuit 220-1 may be a signal having been passed through the first through fourth delay cells 230-1 through 230-4 and then passed back through the third through first delay cells 230-3 through 230-1.

A phase of the amplified clock signal CLKA delayed when one delay cell (e.g., 230-1) is turned on may be determined when the SOC 120 is formed and may have a fixed value, but the inventive concept is not restricted to example embodiments. In other words, a phase of the amplified clock signal CLKA delayed when one delay cell (e.g., 230-1) is turned on may be changed, and it may be changed during the operation of the SOC 120.

Figure 4:
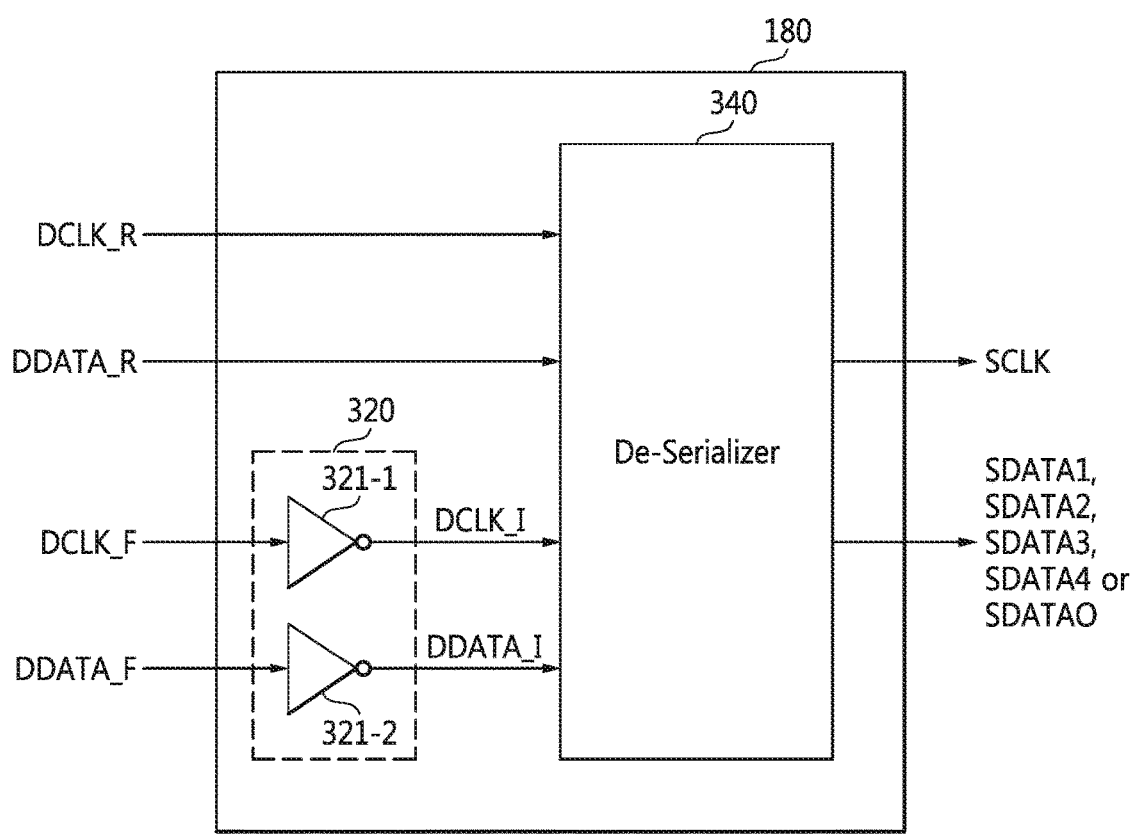
FIG. 4 is a detailed block diagram of a sampling circuit included in the SOC illustrated in FIG. 1.

FIG. 4 is a detailed block diagram of the sampling circuit 180 included in the SOC 120 illustrated in FIG. 1. Referring to FIGS. 1 and 4, the sampling circuit 180 includes an inverter circuit 320 and a de-serializer 340.

The inverter circuit 320 includes a first inverter 321-1 and a second inverter 321-2. The first inverter 321-1 inverts the second delayed clock signals DCLK_F, and the second inverter 321-2 inverts the second delayed data signals DDATA_F. The de-serializer 340 receives the first delayed clock signals DCLK_R, the first delayed data signals DDATA_R, inverted clock signals DCLK_I, and inverted data signals DDATA_I, and samples the first delayed data signals DDATA_R and the inverted data signals DDATA_I, using the first delayed clock signals DCLK_R and the inverted clock signals DCLK_I. The de-serializer 340 outputs the sampled data signals SDATA1, SDATA2, SDATA3, SDATA4, or SDATAO as the sampling result.

When skew calibration of the amplified clock signal CLKA and the amplified data signal DATAA is not completed, the de-serializer 340 may sequentially receive the first delayed clock signals DCLK_R, the first delayed data signals DDATA_R, the inverted clock signals DCLK_I, and the inverted data signals DDATA_I. The order in which the first delayed clock signals DCLK_R, the first delayed data signals DDATA_R, the inverted clock signals DCLK_I, and the inverted data signals DDATA_I are transmitted to the de-serializer 340 may be changed. Contrarily, when skew calibration of the amplified clock signal CLKA and the amplified data signal DATAA is completed, the de-serializer 340 may receive the first delayed clock signals DCLK_R, the first delayed data signals DDATA_R, the inverted clock signals DCLK_I, and the inverted data signals DDATA_I at the same time.

The de-serializer 340 may de-serialize the first delayed clock signals DCLK_R and/or the amplified clock signal CLKA. The de-serializer 340 may de-serialize the first delayed clock signals DCLK_R and/or the amplified clock signal CLKA at a ratio of 1:8, but the inventive concept is not restricted to example embodiments. In other words, the ratio at which the de-serializer 340 de-serializes the first delayed clock signals DCLK_R and/or the amplified clock signal CLKA may be changed according to example embodiments. The de-serializer 340 generates the sampled clock signal SCLK as the result of de-serializing the first delayed clock signals DCLK_R and/or the amplified clock signal CLKA, and transmits the sampled clock signal SCLK to the de-skew control circuit 200.

When skew calibration of the amplified clock signal CLKA and the amplified data signal DATAA is not completed and the de-serializer 340 de-serializes the first delayed clock signals DCLK_R, the sampling circuit 180 may receive the amplified clock signal CLKA instead of the second delayed clock signals DCLK_F, a rising edge of the amplified data signal DATAA instead of the first delayed data signals DDATA_R, and a falling edge of the amplified data signal DATAA instead of the second delayed data signals DDATA_F. Accordingly, the de-serializer 340 may receive an inverted version of the amplified clock signal CLKA, may sample a rising edge and a falling edge of the amplified data signal DATAA, using the first delayed clock signals DCLK_R and the inverted version of the amplified clock signal CLKA, and may generate the first sampled data signals SDATA1 as the sampling result.

Due to the de-serialization of the de-serializer 340, the first sampled data signals SDATA1 may include a plurality of bits. The first sampled data signals SDATA1 may include 16 bits, but the inventive concept is not restricted to example embodiments. In other words, the number of bits included in the first sampled data signals SDATA1 may be changed according to example embodiments.

When skew calibration of the amplified clock signal CLKA and the amplified data signal DATAA is not completed and the sampling circuit 180 receives the first delayed data signals DDATA_R, the sampling circuit 180 may receive the amplified clock signal CLKA instead of the first and second delayed clock signals DCLK_R and DCLK_F, and receive the falling edge of the amplified data signal DATAA instead of the second delayed data signals DDATA_F. Accordingly, the de-serializer 340 may receive the amplified clock signal CLKA and the inverted version of the amplified clock signal CLKA, may sample the first delayed data signals DDATA_R and the falling edge of the amplified data signal DATAA, using the amplified clock signal CLKA and the inverted version of the amplified clock signal CLKA, and may generate the second sampled data signals SDATA2 as the sampling result.

Due to the de-serialization of the de-serializer 340, the second sampled data signals SDATA2 may include a plurality of bits. The second sampled data signals SDATA2 may include 16 bits, but the inventive concept is not restricted to example embodiments. In other words, the number of bits included in the second sampled data signals SDATA2 may be changed according to example embodiments.

When skew calibration of the amplified clock signal CLKA and the amplified data signal DATAA is not completed and the sampling circuit 180 receives the second delayed clock signals DCLK_F, the sampling circuit 180 may receive the amplified clock signal CLKA instead of the first delayed clock signals DCLK_R, the rising edge of the amplified data signal DATAA instead of the first delayed data signals DDATA_R, and the falling edge of the amplified data signal DATAA instead of the second delayed data signals DDATA_F. Accordingly, the de-serializer 340 may sample the rising and falling edges of the amplified data signal DATAA, using the inverted clock signals DCLK_I and the amplified clock signal CLKA, and may generate the third sampled data signals SDATA3 as the sampling result.

Due to the de-serialization of the de-serializer 340, the third sampled data signals SDATA3 may include a plurality of bits. The third sampled data signals SDATA3 may include 16 bits, but the inventive concept is not restricted to example embodiments. In other words, the number of bits included in the third sampled data signals SDATA3 may be changed according to example embodiments.

When skew calibration of the amplified clock signal CLKA and the amplified data signal DATAA is not completed and the sampling circuit 180 receives the second delayed data signals DDATA_F, the sampling circuit 180 may receive the amplified clock signal CLKA instead of the first and second delayed clock signals DCLK_R and DCLK_F, and receive the rising edge of the amplified data signal DATAA instead of the first delayed data signals DDATA_R. Accordingly, the de-serializer 340 may receive the amplified clock signal CLKA and the inverted version of the amplified clock signal CLKA, may sample the second delayed data signals DDATA_F and the rising edge of the amplified data signal DATAA, using the amplified clock signal CLKA and the inverted version of the amplified clock signal CLKA, and may generate the fourth sampled data signals SDATA4 as the sampling result.

Due to the de-serialization of the de-serializer 340, the fourth sampled data signals SDATA4 may include a plurality of bits. The fourth sampled data signals SDATA4 may include 16 bits, but the inventive concept is not restricted to example embodiments. In other words, the number of bits included in the fourth sampled data signals SDATA4 may be changed according to example embodiments.

Figure 5:
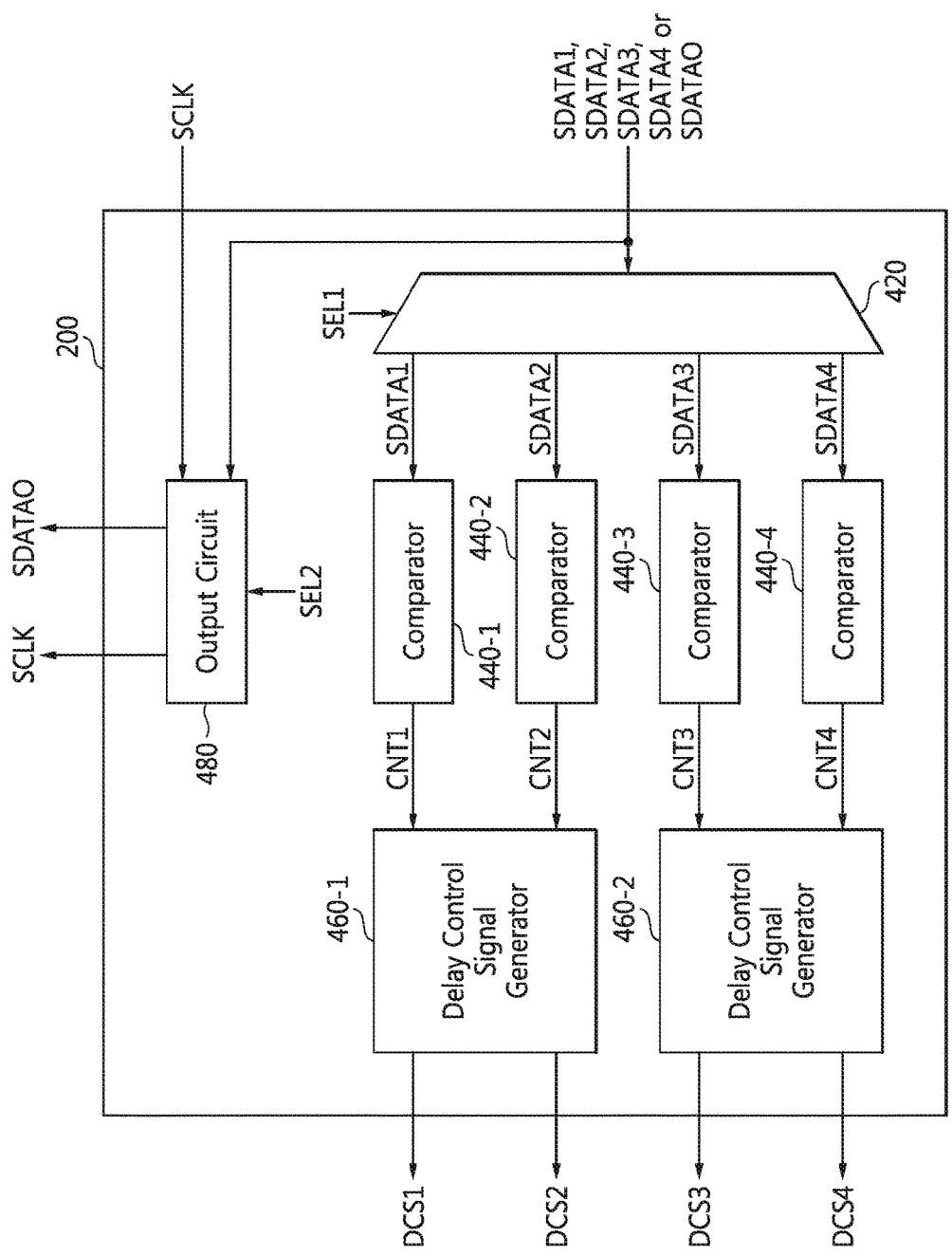
FIG. 5 is a detailed block diagram of a de-skew control circuit included in the SOC illustrated in FIG. 1.

FIG. 5 is a detailed block diagram of the de-skew control circuit 200 included in the SOC 120 illustrated in FIG. 1. Referring to FIGS. 1 and 5, the de-skew control circuit 200 includes a multiplexer 420, a plurality of comparators 440-1 through 440-4, a plurality of delay control signal generators 460-1 and 460-2, and an output circuit 480.

The multiplexer 420 selectively outputs the sampled data signals SDATA1, SDATA2, SDATA3, or SDATA4 in response to a first selection signal SEL1. In detail, when the first selection signal SEL1 corresponds to the first sampled data signals SDATA1, the multiplexer 420 transmits the first sampled data signals SDATA1 to the first comparator 440-1. When the first selection signal SEL1 corresponds to the second sampled data signals SDATA2, the multiplexer 420 transmits the second sampled data signals SDATA2 to the second comparator 440-2. When the first selection signal SEL1 corresponds to the third sampled data signals SDATA3, the multiplexer 420 transmits the third sampled data signals SDATA3 to the third comparator 440-3. When the first selection signal SEL1 corresponds to the fourth sampled data signals SDATA4, the multiplexer 420 transmits the fourth sampled data signals SDATA4 to the fourth comparator 440-1.

The first comparator 440-1 compares each of the first sampled data signals SDATA1 with a first reference signal, decides a pass or a fail for each of the first sampled data signals SDATA1, and generates a first count signal CNT1, based on the decision result. The first comparator 440-1 may compare each of bits included in each of the first sampled data signals SDATA1 with the first reference signal, and may decide a pass for each bit when the bit is the same as the first reference signal or a fail for the bit when the bit is not the same as the first reference signal. The first count signal CNT1 indicates the number of bits having been passed among the bits included in each of the first sampled data signals SDATA1.

The second comparator 440-2 compares each of the second sampled data signals SDATA2 with a second reference signal, decides a pass or a fail for each of the second sampled data signals SDATA2, and generates a second count signal CNT2 based on the decision result. The second comparator 440-2 may compare each of bits included in each of the second sampled data signals SDATA2 with the second reference signal, and may decide a pass for each bit when the bit is the same as the second reference signal or a fail for the bit when the bit is not the same as the second reference signal. The second count signal CNT2 indicate the number of bits having been passed among the bits included in each of the second sampled data signals SDATA2.

The third comparator 440-3 compares each of the third sampled data signals SDATA3 with a third reference signal, decides a pass or a fail for each of the third sampled data signals SDATA3, and generates a third count signal CNT3 based on the decision result. The third comparator 440-3 may compare each of bits included in each of the third sampled data signals SDATA3 with the third reference signal, and may decide a pass for each bit when the bit is the same as the third reference signal or a fail for the bit when the bit is not the same as the third reference signal. The third count signal CNT3 indicates the number of bits having been passed among the bits included in each of the third sampled data signals SDATA3.

The fourth comparator 440-4 compares each of the fourth sampled data signals SDATA4 with a fourth reference signal, decides a pass or a fail for each of the fourth sampled data signals SDATA4, and generates a fourth count signal CNT4 based on the decision result. The fourth comparator 440-4 may compare each of bits included in each of the fourth sampled data signals SDATA4 with the fourth reference signal, and may decide a pass for each bit when the bit is the same as the fourth reference signal or a fail for the bit when the bit is not the same as the fourth reference signal. The fourth count signal CNT4 indicates the number of bits having been passed among the bits included in each of the fourth sampled data signals SDATA4.

When one among the sampled data signals SDATA1, SDATA2, SDATA3, or SDATA4, e.g., the first sampled data signals SDATA1, is de-serialized at a ratio of 1:16, the comparator 440-1, 440-2, 440-3, or 440-4, e.g., the first comparator 440-1 may receive a sampled data signal SDATA1 including 16 bits at a time. The first comparator 440-1 may compare the 16 bits with the first reference signal, may decide a pass or a fail for each of the 16 bits, and may decide a pass or a fail for the first sampled data signal SDATA1 based on the pass or fail decision about each of the 16 bits.

When all of the bits received at the same time have passed, the comparator 440-1, 440-2, 440-3, or 440-4 may decide a pass for the sampled data signal SDATA1, SDATA2, SDATA3, or SDATA4, but the inventive concept is not restricted to example embodiments. In other words, criteria based on which pass or fail of the sampled data signal SDATA1, SDATA2, SDATA3, or SDATA4 is determined may be different according to example embodiments.

The first through fourth reference signals may be determined in advance and stored in the respective comparators 440-1, 440-2, 440-3, and 440-4. The de-skew control circuit 200 may recognize in advance whether the data signal SDATA1, SDATA2, SDATA3, or SDATA4 to be received has been sampled at a rising edge or a falling edge of the sampled clock signals SCLK, and may store a datum to pass as a reference signal. In other words, when the data signal SDATA1, SDATA2, SDATA3, or SDATA4 has been sampled at the rising edge of the sampled clock signals SCLK, the reference signal may have a value corresponding to "0" or "low". When the data signal SDATA1, SDATA2, SDATA3, or SDATA4 has been sampled at the falling edge of the sampled clock signals SCLK, the reference signal may have a value corresponding to "1" or "high".

The first comparator 440-1 transmits the first count signal CNT1 to the first delay control signal generator 460-1, and the second comparator 440-2 transmits the second count signal CNT2 to the first delay control signal generator 460-1. The third comparator 440-3 transmits the third count signal CNT3 to the second delay control signal generator 460-2, and the fourth comparator 440-4 transmits the fourth count signal CNT4 to the second delay control signal generator 460-2.

The first delay control signal generator 460-1 generates the first and second control signals DCS1 and DCS2, using the first and second count signals CNT1 and CNT2. In detail, the first delay control signal generator 460-1 may generate the first and second control signals DCS1 and DCS2 based on a first control value obtained by dividing a difference between the first and second count signals CNT1 and CNT2 by 2. When a value obtained by dividing the difference between the first and second count signals CNT1 and CNT2 by 2 is not an integer, the first control value may be obtained by rounding off the division result to the nearest integer.

The first delay control signal generator 460-1 may transmit the first and second control signals DCS1 and DCS2 to the delay control circuit 160. When the first control value is a positive number, the first delay control signal DCS1 may instruct that the amplified clock signal CLKA be delayed by the first control value, and the second delay control signal DCS2 may instruct that the amplified data signal DATAA not be delayed. When the first control value is 0, the first delay control signal DCS1 may instruct that the amplified clock signal CLKA not be delayed, and the second delay control signal DCS2 may instruct that the amplified data signal DATAA not be delayed. When the first control value is a negative number, the first delay control signal DCS1 may instruct that the amplified clock signal CLKA not be delayed, and the second delay control signal DCS2 may instruct that the amplified data signal DATAA be delayed by the first control value.

That the amplified clock signal CLKA (or the amplified data signal DATAA) is delayed by the first control value may mean to select a signal delayed by the first control value among the first delayed clock signals DCLK_R (or the first delayed data signals DDATA_R) generated by the delay control circuit 160. For instance, when a first sampled data signal SDATA1 includes 16 bits and six bits among the 16 bits pass, the first count signal CNT1 may correspond to a decimal number of 6. When a second sampled data signal SDATA2 includes 16 bits and two bits among the 16 bits pass, the second count signal CNT2 may correspond to a decimal number of 2. Accordingly, the first control value is 2 obtained by dividing the difference between 6 and 2 by 2. At this time, the first delay control signal generator 460-1 may generate the first delay control signal DCS1 instructing that the amplified clock signal CLKA be delayed by 2 and the second delay control signal DCS2 instructing that the amplified data signal DATAA not be delayed.

The second delay control signal generator 460-2 generates the third and fourth control signals DCS3 and DCS4, using the third and fourth count signals CNT3 and CNT4. In detail, the second delay control signal generator 460-2 may generate the third and fourth control signals DCS3 and DCS4 based on a second control value obtained by dividing a difference between the third and fourth count signals CNT3 and CNT4 by 2. When a value obtained by dividing the difference between the third and fourth count signals CNT3 and CNT4 by 2 is not an integer, the second control value may be obtained by rounding off the division result to the nearest integer.

The second delay control signal generator 460-2 may transmit the third and fourth control signals DCS3 and DCS4 to the delay control circuit 160. When the second control value is a positive number, the third delay control signal DCS3 may instruct that the amplified clock signal CLKA be delayed by the second control value, and the fourth delay control signal DCS4 may instruct that the amplified data signal DATAA not be delayed. When the second control value is 0, the third delay control signal DCS3 may instruct that the amplified clock signal CLKA not be delayed, and the fourth delay control signal DCS4 may instruct that the amplified data signal DATAA not be delayed. When the second control value is a negative number, the third delay control signal DCS3 may instruct that the amplified clock signal CLKA not be delayed, and the fourth delay control signal DCS4 may instruct that the amplified data signal DATAA be delayed by the second control value.

That the amplified clock signal CLKA (or the amplified data signal DATAA) is delayed by the second control value may mean to select a signal delayed by the second control value among the second delayed clock signals DCLK_F (or the second delayed data signals DDATA_F) generated by the delay control circuit 160. For instance, when a third sampled data signal SDATA3 includes 16 bits and two bits among the 16 bits pass, the third count signal CNT3 may correspond to a decimal number of 2. When a fourth sampled data signal SDATA4 includes 16 bits and six bits among the 16 bits pass, the fourth count signal CNT4 may correspond to a decimal number of 6. Accordingly, the second control value is −2 obtained by dividing the difference between 2 and 6 by 2. At this time, the second delay control signal generator 460-2 may generate the third delay control signal DCS3 instructing that the amplified clock signal CLKA not be delayed and the fourth delay control signal DCS4 instructing that the amplified data signal DATAA be delayed by 2.

The output circuit 480 outputs the sampled clock signal SCLK and the output sampled data signal SDATAO to a link in response to a second selection signal SEL2 indicating that skew calibration has been completed. The first and second selection signals SEL1 and SEL2 may be controlled by the de-skew control circuit 200, but the inventive concept is not restricted to example embodiments. The first and second selection signals SEL1 and SEL2 may be controlled by a processor separated from the de-skew control circuit 200 in other example embodiments.

Figure 6:
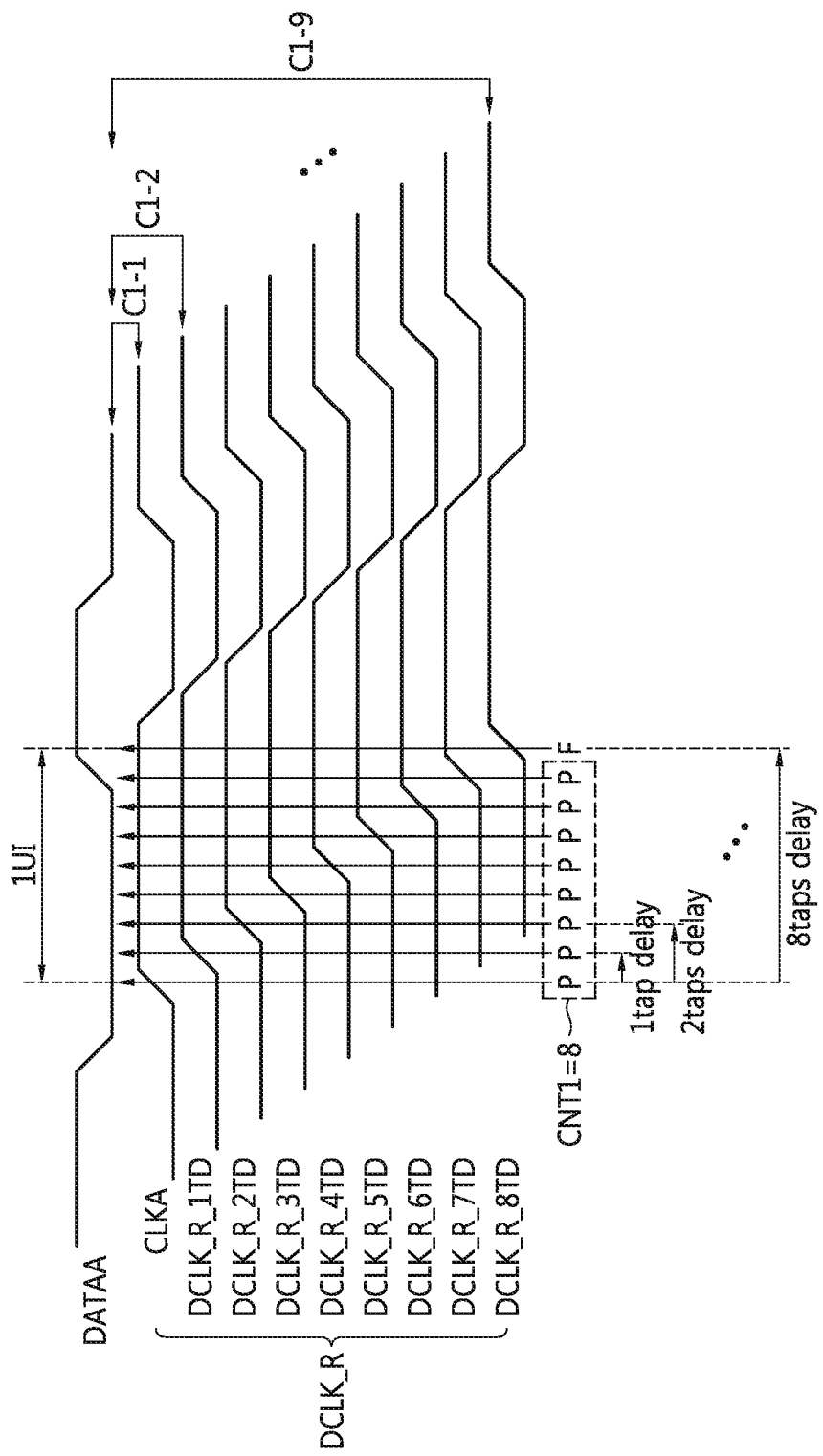
FIG. 6 is a timing chart when an amplified data signal is fixed and a rising edge of an amplified clock signal is delayed by different delays, according to example embodiments.

FIG. 6 is a timing chart when the amplified data signal DATAA is fixed and a rising edge of the amplified clock signal CLKA is delayed by different delays, according to example embodiments. Referring to FIGS. 1 through 6, the first delayed clock signals DCLK_R includes clock signals CLKA and DCLK_R_1TD through DCLK_R_8TD. Although the first delayed clock signals DCLK_R include nine clock signals in the example embodiments illustrated in FIG. 6, the inventive concept is not restricted to the example embodiments. The number of clock signals included in the first delayed clock signals DCLK_R may be changed according to example embodiments. The first delayed clock signals DCLK_R may include the amplified clock signal CLKA and the delayed rising clock signals DCLK_R_1TD through DCLK_R_8TD. A phase difference between the amplified clock signal CLKA and the first delayed rising clock signal DCLK_R_1TD is 1 tap, which is the same as a phase difference between the (n−1)-th delayed rising clock signal DCLK_R_(n−1)TD and the n-th delayed rising clock signal DCLK_R_nTD, where "n" is a natural number of at least 2 and at most 8.

The delay control circuit 160 may sequentially output the signals included in the first delayed clock signals DCLK_R to the sampling circuit 180. The delay control circuit 160 may output the amplified clock signal CLKA and the delayed rising clock signals DCLK_R_1TD through DCLK_R_8TD at regular intervals.

The sampling circuit 180 may receive the amplified clock signal CLKA and perform first sampling C1-1 on the amplified data signal DATAA, using the amplified clock signal CLKA. The amplified data signal DATAA that has been sampled at a rising edge of the amplified clock signal CLKA is 0, i.e., low. The de-skew control circuit 200 may compare the sampled data "0" with the first reference signal. As the result of the comparison, the amplified data signal DATAA that has been sampled at the rising edge of the amplified clock signal CLKA may pass (denoted by P).

Similarly, the sampling circuit 180 may receive the first delayed rising clock signal DCLK_R_1TD obtained when the amplified clock signal CLKA is delayed by 1 tap and perform second sampling C1-2 on the amplified data signal DATAA, using the first delayed rising clock signal DCLK_R_1TD. The amplified data signal DATAA that has been sampled at a rising edge of the first delayed rising clock signal DCLK_R_1TD is 0, i.e., low. The de-skew control circuit 200 may compare the sampled data "0" with the first reference signal. As the result of the comparison, the amplified data signal DATAA that has been sampled at the rising edge of the first delayed rising clock signal DCLK_R_1TD may pass (denoted by P).

Referring to FIG. 6, the number of passes for the amplified data signal DATAA sampled using the first delayed clock signals DCLK_R in one unit interval (1UI) is 8, and therefore, the first count signal CNT1 includes data corresponding to a decimal number of 8.

Figure 7:
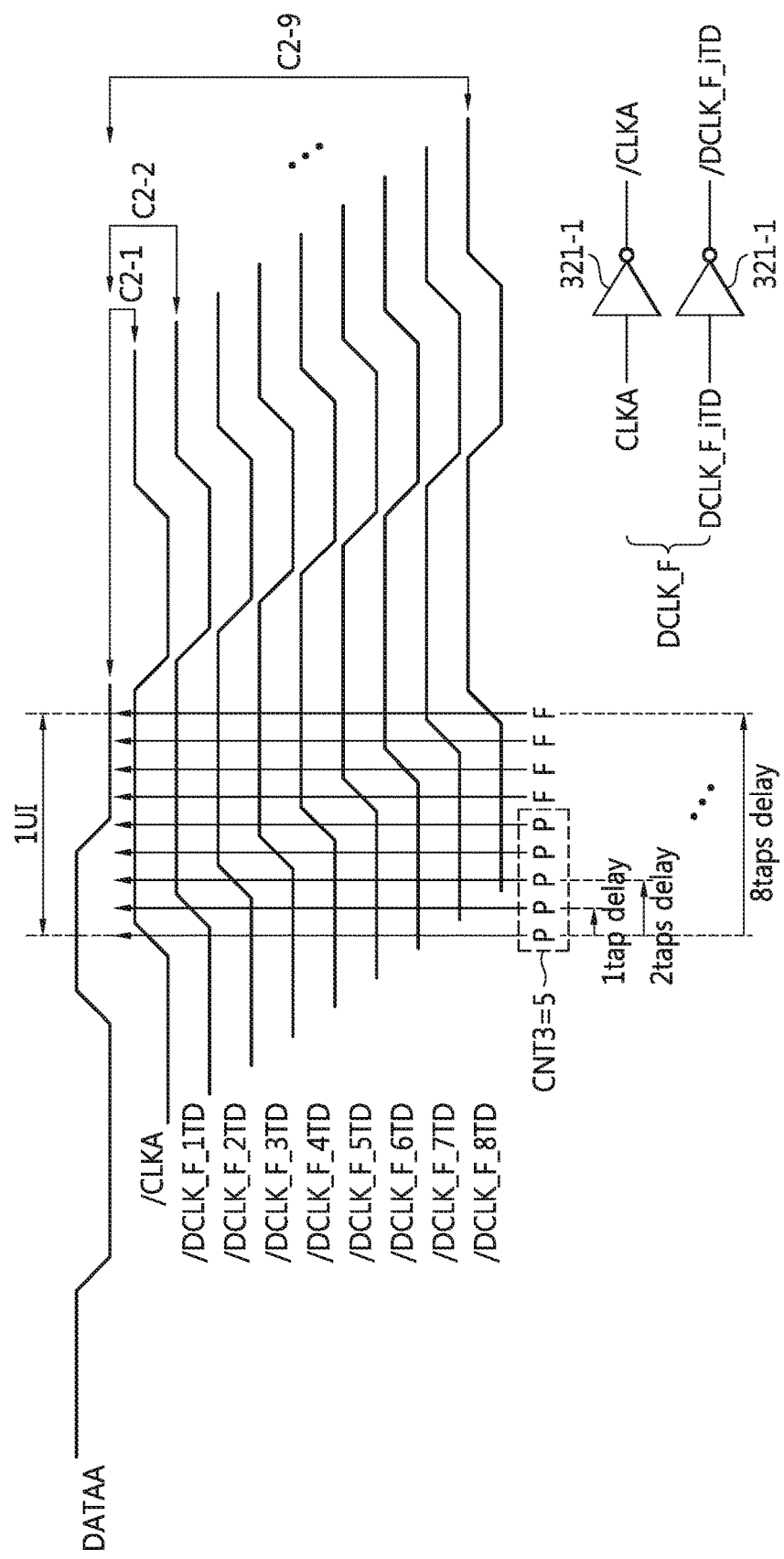
FIG. 7 is a timing chart when the amplified data signal is fixed and a falling edge of the amplified clock signal is delayed by different delays, according to example embodiments.

FIG. 7 is a timing chart when the amplified data signal DATAA is fixed and a falling edge of the amplified clock signal CLKA is delayed by different delays, according to example embodiments. Referring to FIGS. 1 through 5 and FIG. 7, the second delayed clock signals DCLK_F include a plurality of clock signals. Although the second delayed clock signals DCLK_F include nine clock signals in the example embodiments illustrated in FIG. 7, the inventive concept is not restricted to the example embodiments. The number of clock signals included in the second delayed clock signals DCLK_F may be changed according to example embodiments.

The second delayed clock signals DCLK_F includes the amplified clock signal CLKA and a plurality of delayed falling clock signals DCLK_F_1TD through DCLK_F_8TD. An inverted clock signal /CLKA is a result of inverting the amplified clock signal CLKA, using the first inverter 321-1, and inverted falling clock signals /DCLK_F_1TD through /DCLK_F_8TD is a result of inverting the delayed falling clock signals DCLK_F_1TD through DCLK_F_8TD, using the first inverter 321-1. A phase difference between the inverted clock signal /CLKA and the first inverted falling clock signal /DCLK_F_1TD is 1 tap, which is the same as a phase difference between the (n−1)-th inverted falling clock signal /DCLK_F_(n−1)TD and the n-th inverted falling clock signal /DCLK_F_nTD, where "n" is a natural number of at least 2 and at most 8.

The delay control circuit 160 may sequentially output the delayed falling clock signals DCLK_F_1TD through DCLK_F_8TD to the sampling circuit 180. The delay control circuit 160 may output the amplified clock signal CLKA and the delayed falling clock signals DCLK_F_1TD through DCLK_F_8TD at regular intervals.

The de-serializer 340 may receive the inverted clock signal /CLKA and perform first sampling C2-1 on the amplified data signal DATAA, using the inverted clock signal /CLKA. The amplified data signal DATAA that has been sampled at a rising edge of the inverted clock signal /CLKA is 1, i.e., high. The de-skew control circuit 200 may compare the sampled data "1" with the third reference signal. As the result of the comparison, the amplified data signal DATAA that has been sampled at the rising edge of inverted clock signal /CLKA may pass (denoted by P).

Similarly, the de-serializer 340 may receive the first inverted falling clock signal /DCLK_F_1TD obtained when the inverted clock signal /CLKA is delayed by 1 tap and perform second sampling C2-2 on the amplified data signal DATAA, using the first inverted falling clock signal /DCLK_F_1TD. The amplified data signal DATAA that has been sampled at a rising edge of the first inverted falling clock signal /DCLK_F_1TD is 1, i.e., high. The de-skew control circuit 200 may compare the sampled data "1" with the third reference signal. As the result of the comparison, the amplified data signal DATAA that has been sampled at the rising edge of first inverted falling clock signal /DCLK_F_1TD may pass (denoted by P).

Referring to FIG. 7, the number of passes for the amplified data signal DATAA sampled using the inverted falling clock signals /DCLK_F_1TD through /DCLK_F_8TD in 1UI is 5, and therefore, the third count signal CNT3 includes data corresponding to a decimal number of 5.

Figure 8:
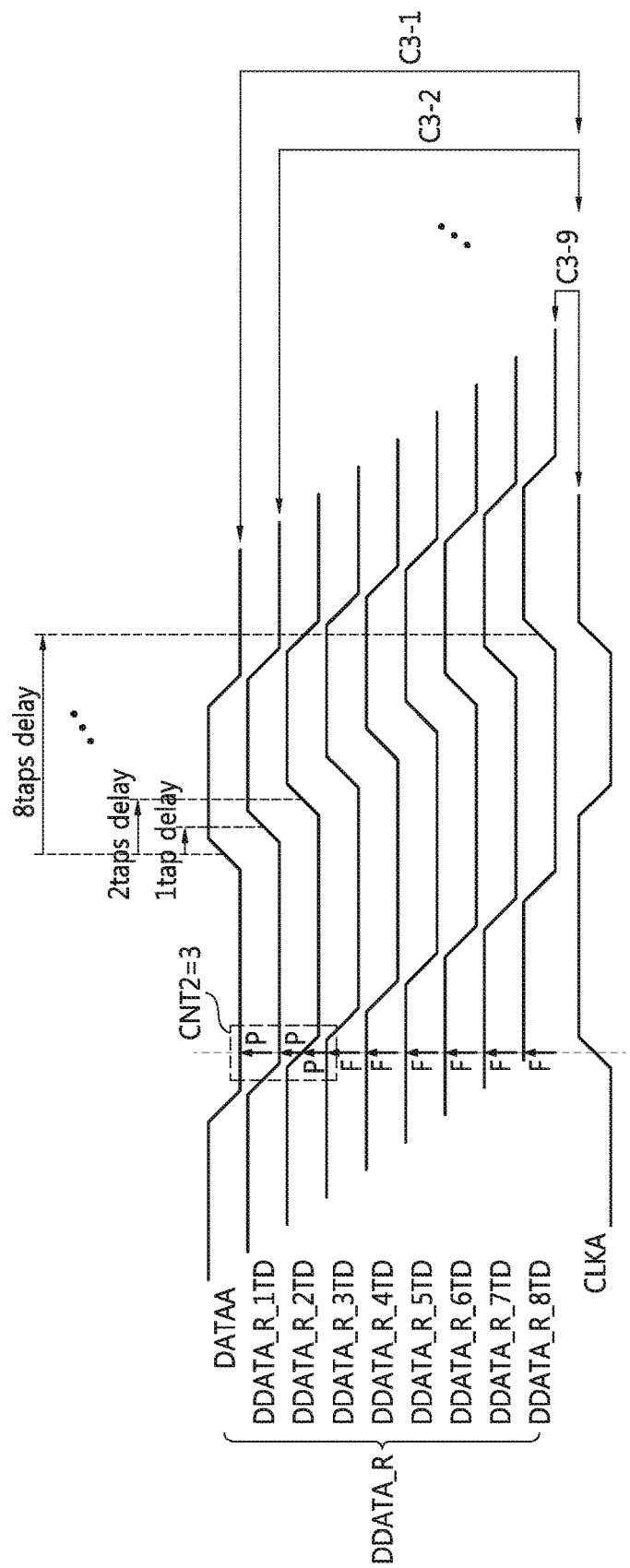
FIG. 8 is a timing chart when the amplified clock signal is fixed and a rising edge of the amplified data signal is delayed by different delays, according to example embodiments.

FIG. 8 is a timing chart when the amplified clock signal CLKA is fixed and a rising edge of the amplified data signal DATAA is delayed by different delays, according to example embodiments. Referring to FIGS. 1 through 5 and FIG. 8, the first delayed data signals DDATA_R include data signals DATAA and DDATA_R_1TD through DDATA_R_8TD. Although the first delayed data signals DDATA_R include nine data signals in the example embodiments illustrated in FIG. 8, the inventive concept is not restricted to the example embodiments. The number of data signals included in the first delayed data signals DDATA_R may be changed according to example embodiments. The first delayed data signals DDATA_R include the amplified data signal DATAA and the delayed rising data signals DDATA_R_1TD through DDATA_R_8TD. A phase difference between the amplified data signal DATAA and the first delayed rising data signal DDATA_R_1TD is 1 tap, which is the same as a phase difference between the (n−1)-th delayed rising data signal DDATA_R_(n−1)TD and the n-th delayed rising data signal DDATA_R_nTD, where "n" is a natural number of at least 2 and at most 8.

The delay control circuit 160 may sequentially output the signals included in the first delayed data signals DDATA_R to the sampling circuit 180. The delay control circuit 160 may output the amplified data signal DATAA and the delayed rising data signals DDATA_R_1TD through DDATA_R_8TD at regular intervals.

The sampling circuit 180 may receive the amplified data signal DATAA and perform first sampling C3-1 on the amplified data signal DATAA, using the amplified clock signal CLKA. The amplified data signal DATAA that has been sampled at a rising edge of the amplified clock signal CLKA is 0, i.e., low. The de-skew control circuit 200 may compare the sampled data "0" with the second reference signal. As the result of the comparison, the amplified data signal DATAA that has been sampled at the rising edge of the amplified clock signal CLKA may pass (denoted by P).

Similarly, the sampling circuit 180 may receive the first delayed rising data signal DDATA_R_1TD obtained when the amplified data signal DATAA is delayed by 1 tap and perform second sampling C3-2 on the first delayed rising data signal DDATA_R_1TD, using the amplified clock signal CLKA. The first delayed rising data signal DDATA_R_1TD that has been sampled at the rising edge of the amplified clock signal CLKA is 0, i.e., low. The de-skew control circuit 200 may compare the sampled data "0" with the second reference signal. As the result of the comparison, the first delayed rising data signal DDATA_R_1TD that has been sampled at the rising edge of the amplified clock signal CLKA may pass (denoted by P).

Referring to FIG. 8, the number of passes for the amplified data signal DATAA sampled using the first delayed data signals DDATA_R is 3, and therefore, the second count signal CNT2 includes data corresponding to a decimal number of 3.

Figure 9:
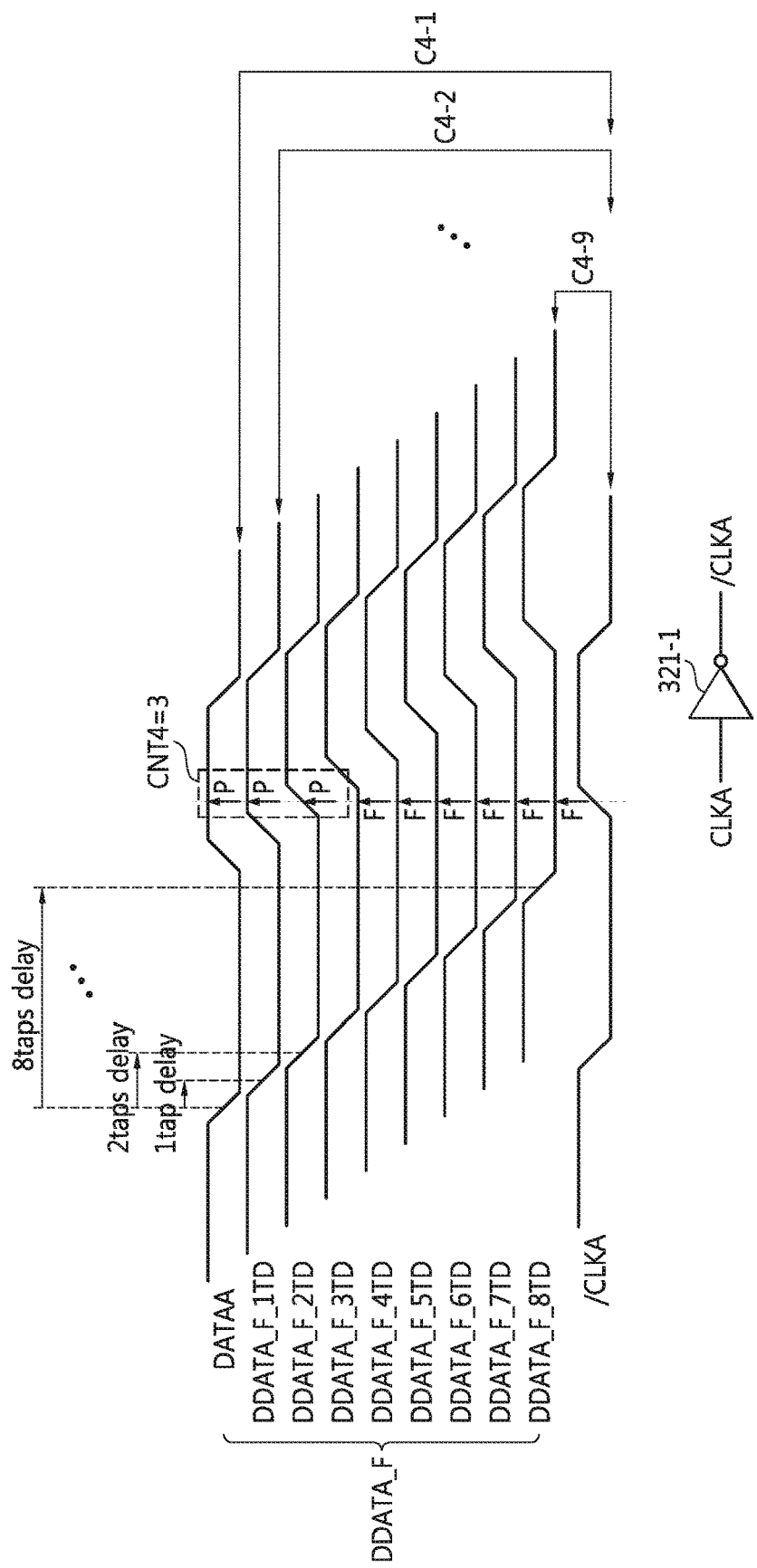
FIG. 9 is a timing chart when the amplified clock signal is fixed and a falling edge of the amplified data signal is delayed by different delays, according to example embodiments.

FIG. 9 is a timing chart when the amplified clock signal CLKA is fixed and a falling edge of the amplified data signal DATAA is delayed by different delays, according to example embodiments. Referring to FIGS. 1 through 5 and FIG. 9, the second delayed data signals DDATA_F include a plurality of data signals DATAA and DDATA_F_1TD through DDATA_F_8TD. Although the second delayed data signals DDATA_F include nine data signals in the example embodiments illustrated in FIG. 9, the inventive concept is not restricted to the example embodiments. The number of data signals included in the second delayed data signals DDATA_F may be changed according to example embodiments.

The second delayed data signals DDATA_F include the amplified data signal DATAA and the delayed falling data signals DDATA_F_1TD through DDATA_F_8TD. The inverted clock signal /CLKA is a result of inverting the amplified clock signal CLKA, using the first inverter 321-1. A phase difference between the amplified data signal DATAA and the first delayed falling data signal DDATA_F_1TD is 1 tap, which is the same as a phase difference between the (n−1)-th delayed falling data signal DDATA_F_(n−1)TD and the n-th delayed falling data signal DDATA_F_nTD, where "n" is a natural number of at least 2 and at most 8.

The delay control circuit 160 may sequentially output the delayed falling data signals DDATA_F_1TD through DDATA_F_8TD to the sampling circuit 180. The delay control circuit 160 may output the amplified data signal DATAA and the delayed falling data signals DDATA_F_1TD through DDATA_F_8TD at regular intervals.

The de-serializer 340 may perform first sampling C4-1 on the amplified data signal DATAA, using the inverted clock signal /CLKA. The amplified data signal DATAA that has been sampled at a rising edge of the inverted clock signal /CLKA is 1, i.e., high. The de-skew control circuit 200 may compare the sampled data "1" with the fourth reference signal. As the result of the comparison, the amplified data signal DATAA that has been sampled at the rising edge of the inverted clock signal /CLKA may pass (denoted by P).

Similarly, the de-serializer 340 may receive the first delayed falling data signal DDATA_F_1TD obtained when the amplified data signal DATAA is delayed by 1 tap and perform second sampling C4-2 on the first delayed falling data signal DDATA_F_1TD, using the inverted clock signal /CLKA. The first delayed falling data signal DDATA_F_1TD that has been sampled at the rising edge of the inverted clock signal /CLKA is 1, i.e., high. The de-skew control circuit 200 may compare the sampled data "1" with the fourth reference signal. As the result of the comparison, the first delayed falling data signal DDATA_F_1TD that has been sampled at the rising edge of the inverted clock signal /CLKA may pass (denoted by P).

Referring to FIG. 9, the number of passes for the amplified data signal DATAA sampled using the delayed falling data signals DDATA_F_1TD through DDATA_F_8TD is 3, and therefore, the fourth count signal CNT4 includes data corresponding to a decimal number of 3.

FIG. 10A is a diagram illustrating an example in which skew calibration is performed on the amplified data signal DATAA having a duty ratio of 5:5 and the amplified clock signal CLKA, according to example embodiments. Referring to FIGS. 1 through 10A, a delay for a rising edge R1 of the amplified clock signal CLKA and a delay for a falling edge F1 of the amplified clock signal CLKA may be determined through the procedure described with reference to FIGS. 6 through 9.

A first period TP1 while the amplified data signal DATAA is low is the same as a second period TP2 while the amplified data signal DATAA is high. At this time, the duty ratio may be 5:5. Referring to FIG. 10A, a first point P1 in the amplified data signal DATAA may be sampled at the rising edge R1 of the amplified clock signal CLKA. Because a time difference T1 between the first point P1 and a first falling edge DF1 of the amplified data signal DATAA is the same as a time difference T1 between a first rising edge DR1 of the amplified data signal DATAA and the first point P1, the number of passes for the first delayed clock signals DCLK_R may be the same as the number of passes for the first delayed data signals DDATA_R.

Accordingly, the first count signal CNT1 and the second count signal CNT2 may include a signal corresponding to a decimal number of 0, and the de-skew control circuit 200 may generate the first delay control signal DCS1 including "0" (or 000000000) to instruct the delay control circuit 160 not to delay a rising edge of the amplified clock signal CLKA. The delay control circuit 160 may not delay the amplified clock signal CLKA to generate a first delayed clock signal DCLK_R, according to the first control signal DCS1.

Similarly, a second point P2 in the amplified data signal DATAA may be sampled at the falling edge F1 of the amplified clock signal CLKA. Because a time difference T2 between the second point P2 and the first rising edge DR1 of the amplified data signal DATAA is the same as a time difference T2 between a second falling edge DF2 of the amplified data signal DATAA and the second point P2, the number of passes for the second delayed clock signals DCLK_F may be the same as the number of passes for the second delayed data signals DDATA_F.

Accordingly, the third count signal CNT3 and the fourth count signal CNT4 may include a signal corresponding to a decimal number of 0, and the de-skew control circuit 200 may generate the third delay control signal DCS3 including "0" (or 000000000) to instruct the delay control circuit 160 not to delay a falling edge of the amplified clock signal CLKA. The delay control circuit 160 may not delay the amplified clock signal CLKA to generate a second delayed clock signal DCLK_F according to the third control signal DCS3.

Figure 10B:
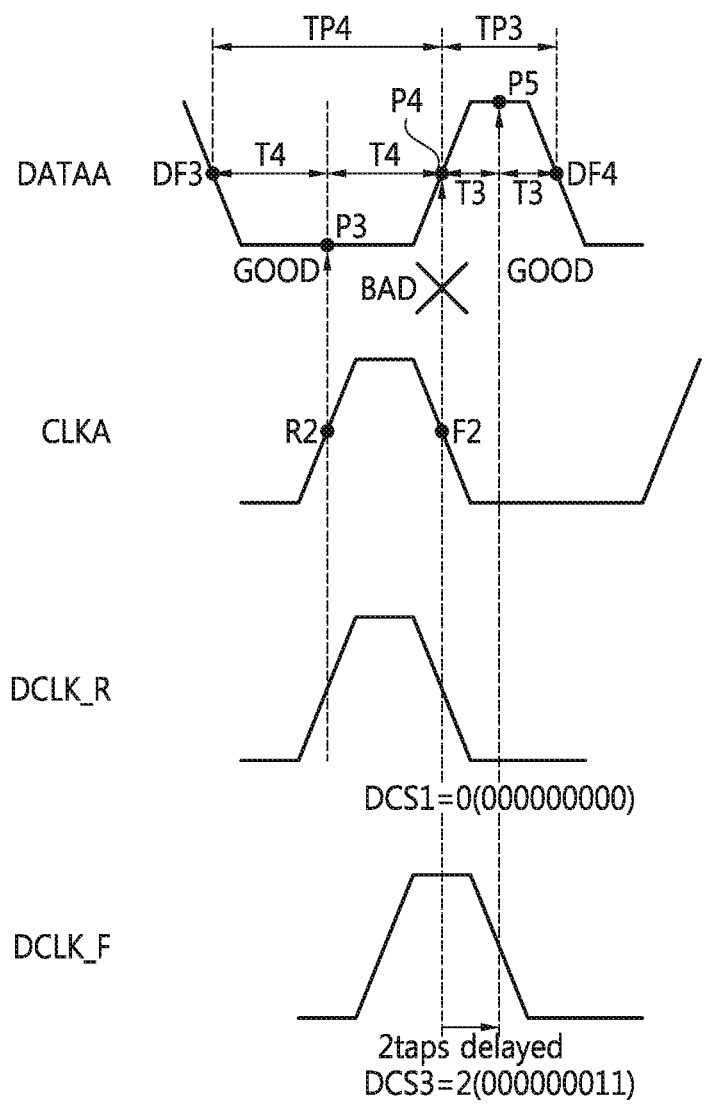
FIG. 10B is a diagram illustrating an example in which skew calibration is performed on the amplified data signal having a duty ratio of 4:6 and the amplified clock signal, according to example embodiments.

FIG. 10B is a diagram illustrating an example in which skew calibration is performed on the amplified data signal DATAA having a duty ratio of 4:6 and the amplified clock signal CLKA, according to example embodiments. Referring to FIGS. 1 through 9 and FIG. 10B, a ratio of a third period TP3 while the amplified data signal DATAA is high to a fourth period TP4 while the amplified data signal DATAA is low is 4:6. At this time, the duty ratio may be 4:6.

Referring to FIG. 10B, a third point P3 in the amplified data signal DATAA may be sampled at a rising edge R2 of the amplified clock signal CLKA. Because a time difference T4 between the third point P3 and a third falling edge DF3 of the amplified data signal DATAA is the same as a time difference T4 between a fourth point in the amplified data signal DATAA and the third point P3, the number of passes for the first delayed clock signals DCLK_R may be the same as the number of passes for the first delayed data signals DDATA_R.

Accordingly, the first count signal CNT1 and the second count signal CNT2 may include a signal corresponding to a decimal number of 0, and the de-skew control circuit 200 may generate the first delay control signal DCS1 including "0" (or 000000000) to instruct the delay control circuit 160 not to delay a rising edge of the amplified clock signal CLKA. The delay control circuit 160 may not delay the amplified clock signal CLKA to generate a first delayed clock signal DCLK_R, according to the first control signal DCS1.

Differently, the fourth point P4 in the amplified data signal DATAA may be sampled at a falling edge F2 of the amplified clock signal CLKA, the fourth point P4 does not fall on the middle of the third period TP3, and therefore, the number of passes for the second delayed clock signals DCLK_F may be different from the number of passes for the second delayed data signals DDATA_F.

When a delay determined for the falling edge F2 of the amplified clock signal CLKA through the procedure described with reference to FIGS. 6 through 9 is two taps, the de-skew control circuit 200 may generate the third delay control signal DCS3 including "2" (or 000000011) to instruct the delay control circuit 160 to delay the falling edge F2 of the amplified clock signal CLKA by two taps. The delay control circuit 160 may generate a second delayed clock signal DCLK_F for sampling a fifth point P5 corresponding to the middle of the third period TP3, i.e., the high period, according to the third control signal DCS3. A time difference T3 between the fifth point P5 and the fourth point P4 is the same as a time difference T3 between a fourth falling edge DF3 of the amplified data signal DATAA and the fifth point P5.

Figure 10C:
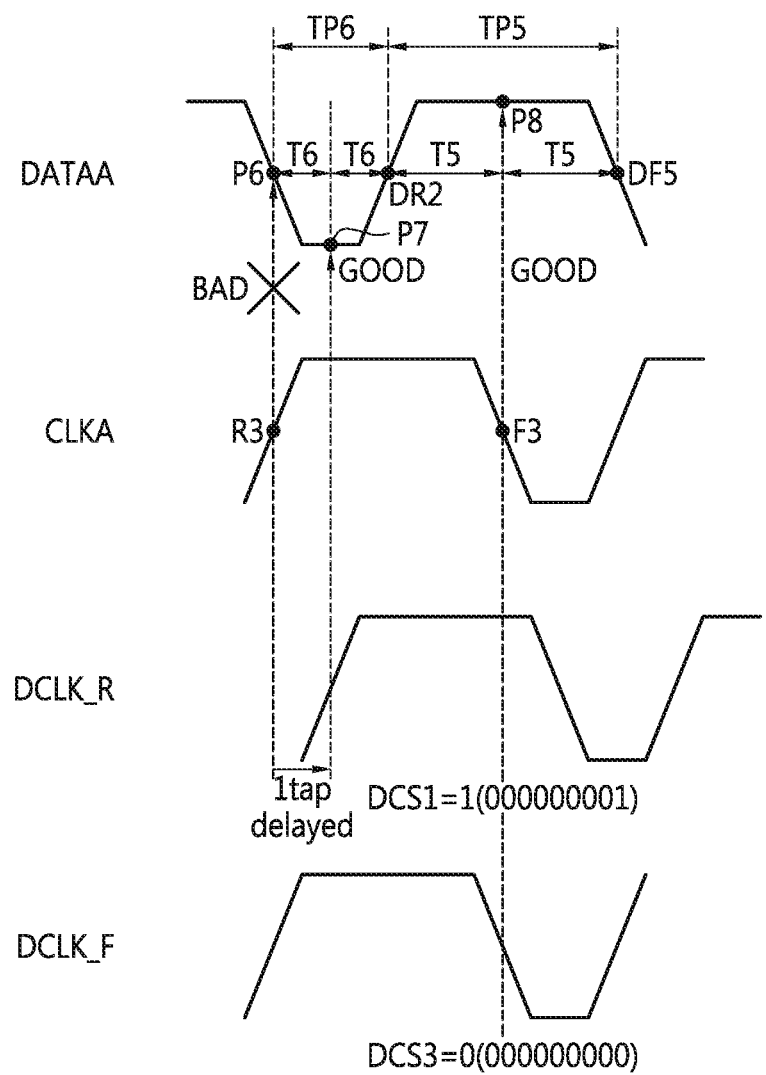
FIG. 10C is a diagram illustrating an example in which skew calibration is performed on the amplified data signal having a duty ratio of 6:4 and the amplified clock signal, according to example embodiments.

FIG. 10C is a diagram illustrating an example in which skew calibration is performed on the amplified data signal DATAA having a duty ratio of 6:4 and the amplified clock signal CLKA, according to example embodiments. Referring to FIGS. 1 through 9 and FIG. 10C, a ratio of a fifth period TP5 while the amplified data signal DATAA is high to a sixth period TP6 while the amplified data signal DATAA is low is 6:4. At this time, the duty ratio may be 6:4.

A sixth point P6 in the amplified data signal DATAA may be sampled at a rising edge R3 of the amplified clock signal CLKA, the sixth point P6 does not fall on the middle of the sixth period TP6, and therefore, the number of passes for the first delayed clock signals DCLK_R may be different from the number of passes for the first delayed data signals DDATA_R. When a delay determined for the rising edge R3 of the amplified clock signal CLKA through the procedure described with reference to FIGS. 6 through 9 is one tap, the de-skew control circuit 200 may generate the first delay control signal DCS1 including "1" (or 000000001) to instruct the delay control circuit 160 to delay the rising edge R3 of the amplified clock signal CLKA by one tap. The delay control circuit 160 may generate a first delayed clock signal DCLK_R for sampling a seventh point P7 corresponding to the middle of the sixth period TP6, according to the first control signal DCS1. A time difference T6 between the seventh point P7 and the sixth point P6 is the same as a time difference T6 between the second rising edge DR2 of the amplified data signal DATAA and the seventh point P7.

Differently, an eighth point P8 in the amplified data signal DATAA may be sampled at a falling edge F3 of the amplified clock signal CLKA. Because a time difference T5 between the eighth point P8 and the second rising edge DR2 of the amplified data signal DATAA is the same as a time difference T5 between a fifth falling edge DF5 of the amplified data signal DATAA and the eighth point P8, the number of passes for the second delayed clock signals DCLK_F may be the same as the number of passes for the second delayed data signals DDATA_R.

Accordingly, the third count signal CNT3 and the fourth count signal CNT4 may include a signal corresponding to a decimal number of 0, and the de-skew control circuit 200 may generate the third delay control signal DCS3 including "0" (or 000000000) to instruct the delay control circuit 160 not to delay a rising edge of the amplified clock signal CLKA. The delay control circuit 160 may not delay the amplified clock signal CLKA to generate a second delayed clock signal DCLK_F, according to the third control signal DCS3.

Figure 11:
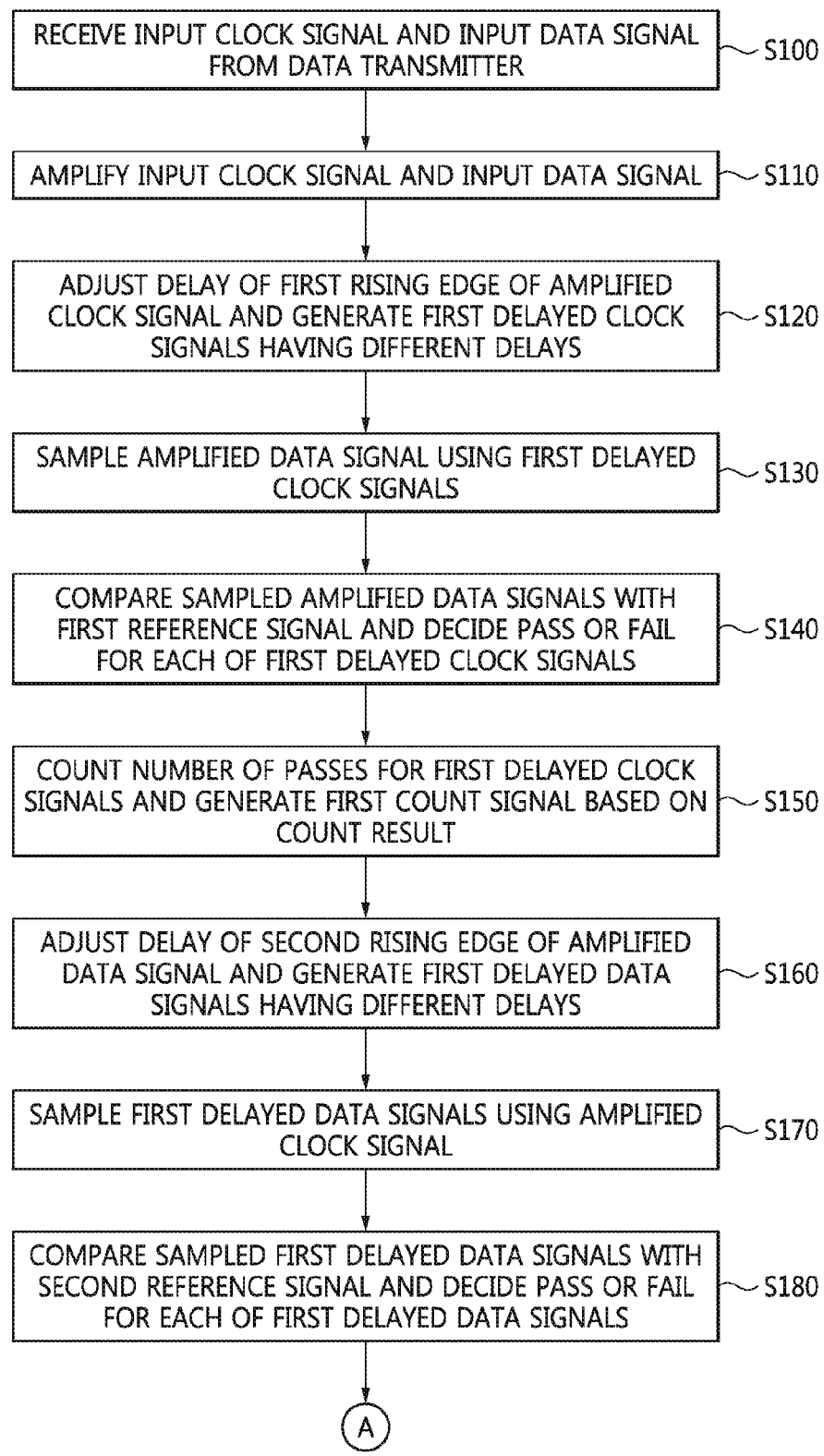
Figure 12:
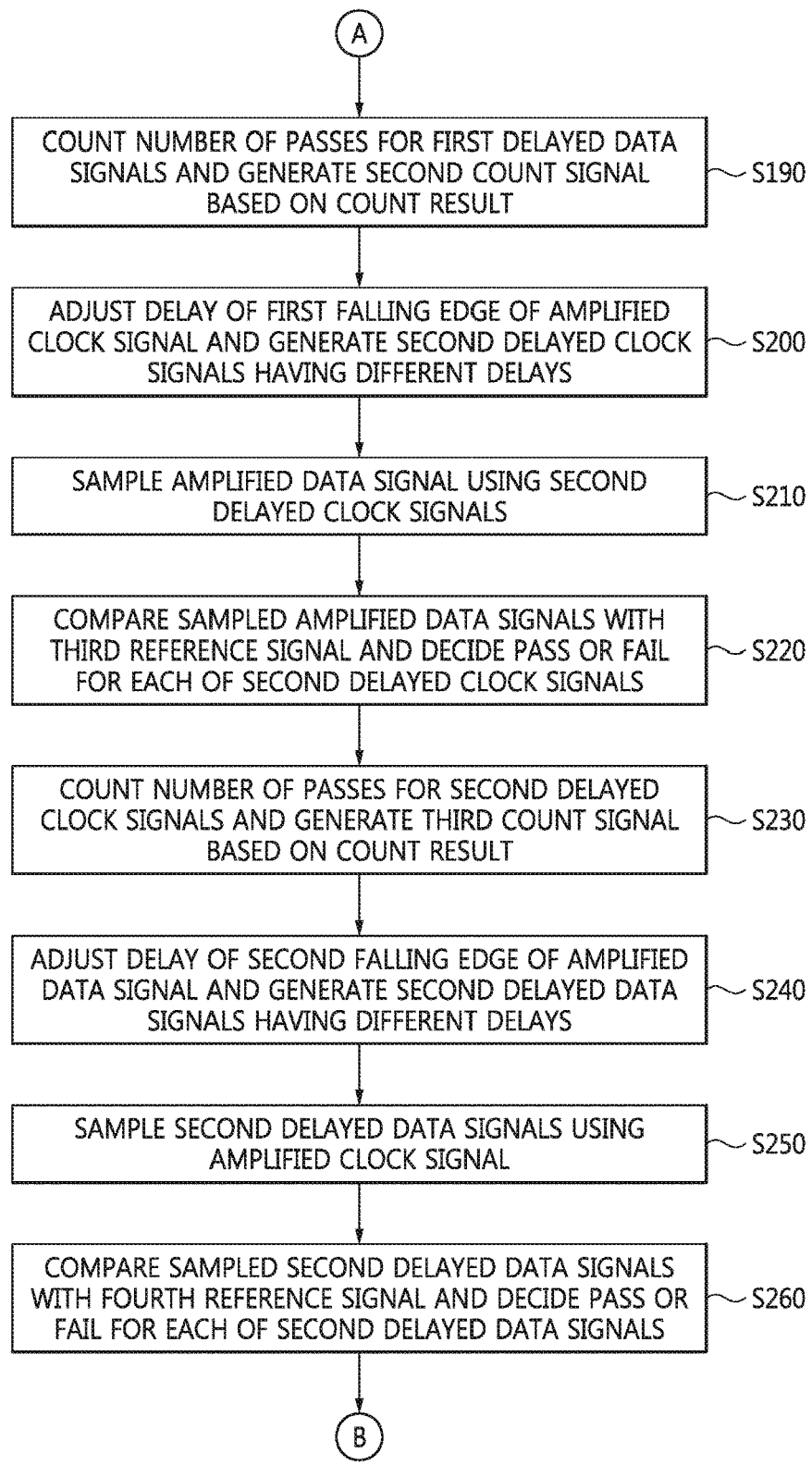

FIGS. 11, 12, and 13 are flowcharts of a procedure in which the SOC 120 performs skew calibration, according to example embodiments. Referring to FIGS. 1 through 5 and FIGS. 11 through 13, the SOC 120 receives the input clock signal CLKIN through the clock input pin 121 and the input data signal DATAIN through the data input pin 122 from the data transmitter 110, in operation S100. The first amplifier 142-1 included in the receiver 140 generates the amplified clock signal CLKA by amplifying the input clock signal CLKIN, and the second amplifier 142-2 included in the receiver 140 generates the amplified data signal DATAA by amplifying the input data signal DATAIN, in operation S110.

The delay control circuit 160 adjusts a delay of a first rising edge of the amplified clock signal CLKA, and generates the first delayed clock signals DCLK_R having different delays, in operation S120. The sampling circuit 180 generates the first sampled data signals SDATA1 by sampling the amplified data signal DATAA, using the first delayed clock signals DCLK_R, in operation S130. The de-skew control circuit 200 compares each of the first sampled data signals SDATA1 with a first reference signal in response to the first selection signal SEL1 corresponding to the first sampled data signals SDATA1, and decides a pass or a fail for each of the first delayed clock signals DCLK_R, based on a comparison result, in operation S140. The de-skew control circuit 200 counts the number of passes for the first delayed clock signals DCLK_R, and generates the first count signal CNT1, based on a count result, in operation S150.

The delay control circuit 160 adjusts a delay of a second rising edge of the amplified data signal DATAA, and generates the first delayed data signals DDATA_R having different delays, in operation S160. The sampling circuit 180 generates the second sampled data signals SDATA2 by sampling the first delayed data signals DDATA_R, using the amplified clock signal CLKA, in operation S170.

The de-skew control circuit 200 compares each of the second sampled data signals SDATA2 with a second reference signal in response to the first selection signal SEL1 corresponding to the second sampled data signals SDATA2, and decides a pass or a fail for each of the first delayed data signals DDATA_R, based on a comparison result, in operation S180. The de-skew control circuit 200 counts the number of passes for the first delayed data signals DDATA_R, and generates the second count signal CNT2, based on a count result, in operation S190.

The delay control circuit 160 adjusts a delay of a first falling edge of the amplified clock signal CLKA, and generates the second delayed clock signals DCLK_F having different delays, in operation S200. The sampling circuit 180 generates the third sampled data signals SDATA3 by sampling the amplified data signal DATAA, using the second delayed clock signals DCLK_F, in operation S210. The de-skew control circuit 200 compares each of the third sampled data signals SDATA3 with a third reference signal in response to the first selection signal SEL1 corresponding to the third sampled data signals SDATA3, and decides a pass or a fail for each of the second delayed clock signals DCLK_F, based on a comparison result, in operation S220. The de-skew control circuit 200 counts the number of passes for the second delayed clock signals DCLK_F, and generates the third count signal CNT3, based on a count result, in operation S230.

The delay control circuit 160 adjusts a second falling edge of the amplified data signal DATAA, and generates the second delayed data signals DDATA_F having different delays, in operation S240. The sampling circuit 180 generates the fourth sampled data signals SDATA4 by sampling the second delayed data signals DDATA_F, using the amplified clock signal CLKA, in operation S250.

The de-skew control circuit 200 compares each of the fourth sampled data signals SDATA4 with a fourth reference signal in response to the first selection signal SEL1 corresponding to the fourth sampled data signals SDATA4, and decides a pass or a fail for each of the second delayed data signals DDATA_F, based on a comparison result, in operation S260. The de-skew control circuit 200 counts the number of passes for the second delayed data signals DDATA_F, and generate the fourth count signal CNT4, based on a count result, in operation S270.

The de-skew control circuit 200 generates the first delay control signal DCS1 for controlling the delay of the first rising edge of the amplified clock signal CLKA and the second delay control signal DCS2 for controlling the delay of the second rising edge of the amplified data signal DATAA, based on the first count signal CNT1 and the second count signal CNT2, and generates the third delay control signal DCS3 for controlling the delay of the first falling edge of the amplified clock signal CLKA and the fourth delay control signal DCS4 for controlling the delay of the second falling edge of the amplified data signal DATAA, based on the third count signal CNT3 and the fourth count signal CNT4, in operation S280. The delay control circuit 160 adjusts the first rising edge of the amplified clock signal CLKA in response to the first delay control signal DCS1, adjusts the second rising edge of the amplified data signal DATAA in response to the second delay control signal DCS2, adjusts the first falling edge of the amplified clock signal CLKA in response to the third delay control signal DCS3, and adjusts the second falling edge of the amplified data signal DATAA in response to the fourth delay control signal DCS4, in operation S290.

The sampling circuit 180 generates the sampled clock signal SCLK by de-serializing the delay-adjusted first rising edge and the delay-adjusted first falling edge, and generates the output sampled data signal SDATAO, using the delay-adjusted first rising edge and the delay-adjusted first falling edge, in operation S300. The de-skew control circuit 200 transmits the output sampled data signal SDATAO and the sampled clock signal SCLK to a link in response to the second selection signal SEL2 indicating that skew calibration has been completed, in operation S310.

As described above, according to example embodiments, a SOC uses both rising and falling edges of clock and data signals, thereby performing reliable skew calibration even when the duty ratio of the clock or data signal is distorted.

As is traditional in the field of the inventive concepts, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the inventive concepts.

While the inventive concept has been shown and described with reference to example embodiments thereof, it will be understood by those of ordinary skill in the art that various changes in forms and details may be made therein without departing from the spirit and scope of the inventive concept as defined by the following claims.

What is claimed is:

1. A system on chip comprising:
   a clock input pin configured to receive an input clock signal;
   a data input pin configured to receive an input data signal;
   a delay control circuit configured to:
      generate first delayed clock signals having different delays, based on a first rising edge of the input clock signal;
      generate second delayed clock signals having different delays, based on a first falling edge of the input clock signal;
      generate first delayed data signals having different delays, based on a second rising edge of the input data signal; and
      generate second delayed data signals having different delays, based on a second falling edge of the input data signal;
   a sampling circuit configured to:
      perform first sampling on the input data signal, based on the first delayed clock signals, to generate first sampled data signals;
      perform second sampling on the first delayed data signals, based on the input clock signal, to generate second sampled data signals;
      perform third sampling on the input data signal, based on the second delayed clock signals, to generate third sampled data signals; and
      perform fourth sampling on the second delayed data signals, based on the input clock signal, to generate fourth sampled data signals; and
   a de-skew control circuit configured to:
      compare the first sampled data signals with a first reference signal, and decide a pass or a fail of each of the first sampled data signals, based on the comparison of the first sampled data signals with the first reference signal;
      compare the second sampled data signals with a second reference signal, and decide a pass or a fail of each of the second sampled data signals, based on the comparison of the second sampled data signals with the second reference signal;
      compare the third sampled data signals with a third reference signal, and decide a pass or a fail of each of the third sampled data signals, based on the comparison of the third sampled data signals with the third reference signal; and
      compare the fourth sampled data signals with a fourth reference signal, and decide a pass or a fail of each of the fourth sampled data signals, based on the comparison of the fourth sampled data signals with the fourth reference signal.

2. The system on chip of claim 1, wherein the de-skew control circuit is further configured to:
   generate a first count signal, based on a number of passes decided for the first sampled data signals;
   generate a second count signal, based on a number of passes decided for the second sampled data signals;
   generate a third count signal, based on a number of passes decided for the third sampled data signals; and
   generate a fourth count signal, based on a number of passes decided for the fourth sampled data signals.

3. The system on chip of claim 2, wherein the de-skew control circuit is further configured to:
   transmit, to the delay control circuit, a first delay control signal for controlling a delay of the first rising edge, and transmit, to the delay control circuit, a second delay control signal for controlling a delay of the second rising edge, based on the first count signal and the second count signal; and
   transmit, to the delay control circuit, a third delay control signal for controlling a delay of the first falling edge, and transmit, to the delay control circuit, a fourth delay control signal for controlling a delay of the second falling edge, based on the third count signal and the fourth count signal.

4. The system on chip of claim 3, wherein the delay control circuit is further configured to:
   select one of the first delayed clock signals, based on the first delay control signal; and
   select one of the second delayed clock signals, based on the third delay control signal.

5. The system on chip of claim 4, wherein the delay control circuit is further configured to:
   select one of the first delayed data signals, based on the second delay control signal; and
   select one of the second delayed data signals, based on the fourth delay control signal.

6. The system on chip of claim 1, wherein the delay control circuit comprises:
   a first clock delay circuit configured to generate the first delayed clock signals, based on the first rising edge of the input clock signal;
   a second clock delay circuit configured to generate the second delayed clock signals, based on the first falling edge of the input clock signal;
   a first data delay circuit configured to generate the first delayed data signals, based on the second rising edge of the input data signal; and
   a second data delay circuit configured to generate the second delayed data signals, based on the second falling edge of the input data signal,
   the first clock delay circuit is separated from the second clock delay circuit, and the first data delay circuit is separated from the second data delay circuit.

7. The system on chip of claim 6, wherein the delay control circuit does not output the first and second delayed clock signals to the sampling circuit at the same time and does not output the first and second delayed data signals to the sampling circuit at the same time.

8. The system on chip of claim 7, wherein the sampling circuit does not output the first and third sampled data signals at the same time and does not output the second and fourth sampled data signals at the same time.

9. The system on chip of claim 1, wherein the de-skew control circuit comprises:
a first comparator configured to compare the first sampled data signals with the first reference signal, and decide the pass or the fail of each of the first sampled data signals, based on the comparison of the first sampled data signals with the first reference signal;
a second comparator configured to compare the second sampled data signals with the second reference signal, and decide the pass or the fail of each of the second sampled data signals, based on the comparison of the second sampled data signals with the second reference signal;
a third comparator configured to compare the third sampled data signals with the third reference signal, and decide the pass or the fail of each of the third sampled data signals, based on the comparison of the third sampled data signals with the third reference signal; and
a fourth comparator configured to compare the fourth sampled data signals with the fourth reference signal, and decide the pass or the fail of each of the fourth sampled data signals, based on the comparison of the fourth sampled data signals with the fourth reference signal,
the first comparator is separated from the third comparator, and
the second comparator is separated from the fourth comparator.

10. A mobile system comprising:
a system on chip; and
a data transmitter configured to transmit, to the system on chip, an input data signal and an input clock signal,
wherein the system on chip comprises:
a clock input pin configured to receive the input clock signal;
a data input pin configured to receive the input data signal;
a delay control circuit configured to:
generate first delayed clock signals having different delays, based on a first rising edge of the input clock signal;
generate second delayed clock signals having different delays, based on a first falling edge of the input clock signal;
generate first delayed data signals having different delays, based on a second rising edge of the input data signal; and
generate second delayed data signals having different delays, based on a second falling edge of the input data signal;
a sampling circuit configured to:
perform first sampling on the input data signal, based on the first delayed clock signals, to generate first sampled data signals;
perform second sampling on the first delayed data signals, based on the input clock signal, to generate second sampled data signals;
perform third sampling on the input data signal, based on the second delayed clock signals, to generate third sampled data signals; and
perform fourth sampling on the second delayed data signals, based on the input clock signal, to generate fourth sampled data signals; and
a de-skew control circuit configured to:
compare the first sampled data signals with a first reference signal, and decide a pass or a fail of each of the first sampled data signals, based on the comparison of the first sampled data signals with the first reference signal;
compare the second sampled data signals with a second reference signal, and decide a pass or a fail of each of the second sampled data signals, based on the comparison of the second sampled data signals with the second reference signal;
compare the third sampled data signals with a third reference signal, and decide a pass or a fail of each of the third sampled data signals, based on the comparison of the third sampled data signals with the third reference signal; and
compare the fourth sampled data signals with a fourth reference signal, and decide a pass or a fail of each of the fourth sampled data signals, based on the comparison of the fourth sampled data signals with the fourth reference signal.

11. The mobile system of claim 10, wherein the de-skew control circuit is further configured to:
generate a first count signal, based on a number of passes decided for the first sampled data signals;
generate a second count signal, based on a number of passes decided for the second sampled data signals;
generate a third count signal, based on a number of passes decided for the third sampled data signals; and
generate a fourth count signal, based on a number of passes decided for the fourth sampled data signals.

12. The mobile system of claim 11, wherein the de-skew control circuit is further configured to:
transmit, to the delay control circuit, a first delay control signal for controlling a delay of the first rising edge, and transmit, to the delay control circuit, a second delay control signal for controlling a delay of the second rising edge, based on the first count signal and the second count signal; and
transmit, to the delay control circuit, a third delay control signal for controlling a delay of the first falling edge, and transmit, to the delay control circuit, a fourth delay control signal for controlling a delay of the second falling edge, based on the third count signal and the fourth count signal.

13. The mobile system of claim 12, wherein the delay control circuit is further configured to:
select one from the first delayed clock signals, based on the first delay control signal; and
select one from the second delayed clock signals, based on the third delay control signal.

14. The mobile system of claim 13, wherein the delay control circuit is further configured to:
select one of the first delayed data signals, based on the second delay control signal; and
select one of the second delayed data signals, based on the fourth delay control signal.

15. The mobile system of claim 10, wherein the delay control circuit comprises:
a first clock delay circuit configured to generate the first delayed clock signals, based on the first rising edge of the input clock signal;
a second clock delay circuit configured to generate the second delayed clock signals, based on the first falling edge of the input clock signal;
a first data delay circuit configured to generate the first delayed data signals, based on the second rising edge of the input data signal; and
a second data delay circuit configured to generate the second delayed data signals, based on the second falling edge of the input data signal,
the first clock delay circuit is separated from the second clock delay circuit, and
the first data delay circuit is separated from the second data delay circuit.

16. The mobile system of claim 10, wherein the de-skew control circuit comprises:
a first comparator configured to compare the first sampled data signals with the first reference signal, and decide the pass or the fail of each of the first sampled data signals, based on the comparison of the first sampled data signals with the first reference signal;
a second comparator configured to compare the second sampled data signals with the second reference signal, and decide the pass or the fail of each of the second sampled data signals, based on the comparison of the second sampled data signals with the second reference signal;
a third comparator configured to compare the third sampled data signals with the third reference signal, and decide the pass or the fail of each of the third sampled data signals, based on the comparison of the third sampled data signals with the third reference signal; and
a fourth comparator configured to compare the fourth sampled data signals with the fourth reference signal, and decide the pass or the fail of each of the fourth sampled data signals, based on the comparison of the fourth sampled data signals with the fourth reference signal,
the first comparator is separated from the third comparator, and
the second comparator is separated from the fourth comparator.

17. An integrated circuit comprising:
a clock input pin configured to receive an input clock signal;
a data input pin configured to receive an input data signal;
a delay control circuit configured to:
generate first delayed clock signals having different delays, based on a first rising edge of the input clock signal;
generate second delayed clock signals having different delays, based on a first falling edge of the input clock signal;
generate first delayed data signals having different delays, based on a second rising edge of the input data signal; and
generate second delayed data signals having different delays, based on a second falling edge of the input data signal;
a sampling circuit configured to:
perform first sampling on the input data signal, based on the first delayed clock signals, to generate first sampled data signals;
perform second sampling on the first delayed data signals, based on the input clock signal, to generate second sampled data signals;
perform third sampling on the input data signal, based on the second delayed clock signals, to generate third sampled data signals; and
perform fourth sampling on the second delayed data signals, based on the input clock signal, to generate fourth sampled data signals; and
a de-skew control circuit configured to:
compare the first sampled data signals with a first reference signal, and decide a pass or a fail of each of the first sampled data signals, based on the comparison of the first sampled data signals with the first reference signal;
compare the second sampled data signals with a second reference signal, and decide a pass or a fail of each of the second sampled data signals, based on the comparison of the second sampled data signals with the second reference signal;
compare the third sampled data signals with a third reference signal, and decide a pass or a fail of each of the third sampled data signals, based on the comparison of the third sampled data signals with the third reference signal;
compare the fourth sampled data signals with a fourth reference signal, and decide a pass or a fail of each of the fourth sampled data signals, based on the comparison of the fourth sampled data signals with the fourth reference signal;
generate a first count signal, based on a number of passes decided for the first sampled data signals;
generate a second count signal, based on a number of passes decided for the second sampled data signals;
generate a third count signal, based on a number of passes decided for the third sampled data signals;
generate a fourth count signal, based on a number of passes decided for the fourth sampled data signals;
transmit, to the delay control circuit, a first delay control signal for controlling a delay of the first rising edge, and transmit, to the delay control circuit, a second delay control signal for controlling a delay of the second rising edge, based on the first count signal and the second count signal; and
transmit, to the delay control circuit, a third delay control signal for controlling a delay of the first falling edge, and transmit, to the delay control circuit, a fourth delay control signal for controlling a delay of the second falling edge, based on the third count signal and the fourth count signal.

18. The integrated circuit of claim 17, wherein the delay control circuit is further configured to:
select one of the first delayed clock signals, based on the first delay control signal; and
select one of the second delayed clock signals, based on the third delay control signal.

19. The integrated circuit of claim 18, wherein the delay control circuit is further configured to:
select one of the first delayed data signals, based on the second delay control signal; and
select one of the second delayed data signals, based on the fourth delay control signal.

20. The integrated circuit of claim 17, wherein the delay control circuit is further configured to:

transmit, to the sampling circuit, the first delayed clock signals sequentially;
transmit, to the sampling circuit, the second delayed clock signals sequentially;
transmit, to the sampling circuit, the first delayed data signals sequentially; and
transmit, to the sampling circuit, the second delayed data signals sequentially.

\* \* \* \* \*